United States Patent
Marcom et al.

(10) Patent No.: US 12,420,446 B2
(45) Date of Patent: Sep. 23, 2025

(54) SYSTEMS AND METHODS FOR STUD PLATE CONNECTOR MOVEMENT

(71) Applicant: BotBuilt, Inc., Durham, NC (US)

(72) Inventors: Sam Marcom, Durham, NC (US);
Dylan Vassily, Durham, NC (US);
Daniel Levy, Durham, NC (US);
Barrett Ames, Durham, NC (US)

(73) Assignee: BotBuilt, Inc., Durham, NC (US)

( * ) Notice: Subject to any disclaimer, the term of this patent is extended or adjusted under 35 U.S.C. 154(b) by 0 days.

(21) Appl. No.: 18/780,378

(22) Filed: Jul. 22, 2024

(65) Prior Publication Data
US 2024/0375312 A1 Nov. 14, 2024

Related U.S. Application Data

(63) Continuation of application No. 18/496,815, filed on Oct. 27, 2023.
(Continued)

(51) Int. Cl.
*B27M 3/00* (2006.01)
*B23Q 3/04* (2006.01)
*E04B 2/70* (2006.01)

(52) U.S. Cl.
CPC ............ *B27M 3/0073* (2013.01); *B23Q 3/04* (2013.01); *E04B 2/70* (2013.01)

(58) Field of Classification Search
CPC ........... E04B 2/70; B23Q 3/04; B27M 3/0073
See application file for complete search history.

(56) References Cited

U.S. PATENT DOCUMENTS

| | | | | |
|---|---|---|---|---|
| 2,544,499 A | * | 3/1951 | Hovey | B27F 4/00 227/154 |
| 3,591,067 A | * | 7/1971 | Vial | B27F 7/04 227/100 |

(Continued)

FOREIGN PATENT DOCUMENTS

| | | | | |
|---|---|---|---|---|
| CA | 2610041 A1 | * | 5/2009 | B27M 3/0073 |
| CN | 208358221 U | | 1/2019 | |

(Continued)

OTHER PUBLICATIONS

International Search Report and Written Opinion for International Patent Application No. PCT/US23/78125, dated Jan. 24, 2024.
(Continued)

*Primary Examiner* — Bayan Salone
(74) *Attorney, Agent, or Firm* — Goodwin Procter LLP

(57) ABSTRACT

Systems and methods for a stud plate connector are disclosed. The system can include a base plate having a first cam slot and a second cam slot, where the second cam slot is approximately a mirror image of the first cam slot. The system can include a first upper cam-follower located within the first cam slot. The system can include a second upper cam-follower located within the second cam slot, where the first and second cam-followers hold opposite sides of a first lumber and move the first lumber to contact a second lumber. The system can include a first lower gripper and a second lower gripper for holding the second lumber in a perpendicular direction with respect to the first lumber. The system can include a bonding device located before to the first and second lumber, where the bonding device bonds the first and second lumber together.

21 Claims, 16 Drawing Sheets

Related U.S. Application Data

(60) Provisional application No. 63/420,527, filed on Oct. 28, 2022.

(56) References Cited

U.S. PATENT DOCUMENTS

| | | | |
|---|---|---|---|
| 5,941,513 A | 8/1999 | Moilanen et al. | |
| 6,273,408 B1* | 8/2001 | Moilanen | B25J 9/08 |
| | | | 269/32 |
| 6,712,347 B1* | 3/2004 | Fredrickson | B23Q 5/40 |
| | | | 269/304 |
| 6,986,204 B2* | 1/2006 | Glenn | B27M 3/0073 |
| | | | 29/897.3 |
| 8,185,240 B2* | 5/2012 | Williams | B25J 15/0019 |
| | | | 901/41 |
| 8,201,343 B2* | 6/2012 | Morris | E04G 21/1891 |
| | | | 33/613 |
| 8,606,399 B2* | 12/2013 | Williams | B25J 9/0009 |
| | | | 901/41 |
| 9,353,519 B2* | 5/2016 | Williams | B27F 7/006 |
| 9,713,870 B2* | 7/2017 | Shi | B25J 9/1687 |
| 10,189,176 B2* | 1/2019 | Williams | B27F 7/003 |
| 10,502,253 B2* | 12/2019 | Watanabe | F16B 33/06 |
| 10,920,434 B1* | 2/2021 | Pearson, Jr. | E04G 21/22 |
| 11,525,270 B2* | 12/2022 | Telleria | B25J 9/1661 |
| 11,905,752 B2* | 2/2024 | Dittrich | E04C 2/386 |
| 2005/0121844 A1* | 6/2005 | Fredrickson | B25B 1/20 |
| | | | 269/37 |
| 2010/0057242 A1* | 3/2010 | Williams | B27F 7/006 |
| | | | 700/114 |
| 2010/0199595 A1* | 8/2010 | Morris | E04G 21/1891 |
| | | | 52/749.1 |
| 2012/0174527 A1* | 7/2012 | Hinshaw | E04F 21/00 |
| | | | 52/749.1 |
| 2013/0283618 A1* | 10/2013 | Wiliams | B27F 7/006 |
| | | | 29/700 |
| 2015/0343640 A1 | 12/2015 | Shi et al. | |
| 2018/0180085 A1 | 6/2018 | Watanabe et al. | |
| 2020/0032528 A1 | 1/2020 | Telleria et al. | |
| 2021/0189747 A1* | 6/2021 | Pearson, Jr. | B25J 5/007 |
| 2022/0010608 A1 | 1/2022 | Dittrich et al. | |
| 2023/0186609 A1* | 6/2023 | Pauwels | B25J 9/1697 |
| | | | 700/259 |
| 2023/0202048 A1* | 6/2023 | Ames | B25J 15/0028 |
| | | | 700/259 |
| 2024/0139991 A1* | 5/2024 | Marcom | B23Q 3/04 |
| 2024/0375288 A1* | 11/2024 | Ames | B25J 15/0052 |

FOREIGN PATENT DOCUMENTS

| | | | | |
|---|---|---|---|---|
| CN | 208358224 U | * | 1/2019 | ............. B23P 19/10 |
| DE | 102004029581 A1 | * | 1/2006 | ............. B60G 7/005 |
| EP | 1351803 A1 | | 10/2003 | |
| EP | 1351803 B1 | * | 5/2006 | ............. B27F 7/006 |

OTHER PUBLICATIONS

Weinmann Holzbausystemtechnik (Video entitled "Robot technology in timber framing", premiered on Dec. 1, 2017, https://www.youtube.com/watch?v=UP83m3CySfQ, herein after "WEINMANN") (Year: 2024).

Adel, Arash & Thoma, Andreas & Helmreich, Matthias & Gramazio, Fabio & Kohler, Matthias. (2018). Design of Robotically Fabricated Timber Frame Structures. 10.52842/conf.acadia.2018.394. (Year: 2024).

Build In Brief—The B1 M (Video entitled "Timber Frame Construction, by Robots | The B1 M", premiered on Mar. 22, 2018, https://www.youtube.com/watch?v=FT1im5SpnBA, hereinafter "The B1 M") (Year: 2024).

Aleksandra Anna Apolinarska, Matteo Pacher, Hui Li, Nicholas Cote, Rafael Pastrana, Fabio Gramazio, Matthias Kohler, Robotic assembly of timber joints using reinforcement learning, Automation in Construction, vol. 125, 2021, 103569, ISSN 0926-5805, https://doi.org/10.1016/j.autcon.2021.103569. (Year: 2021).

Robotic Automation P/L (Video Youtube titled "Robotic Assembly of Custom Crates and Pallets", premiered on Oct. 1, 2015, https://www.youtube.com/watch?v=DsROdc1vubO , hereinafter "Robotic Automation") (Year: 2015).

Hua, Chai & Zhang, Liming & Yuan, Philip. (2020). Advanced Timber Construction Platform: Multi-robot System for Timber Structure Design and Prefabrication. 10.1007/978-981-13-8153-9_27. (Year: 2020).

L. Stadelmann, T. Sandy, A Thoma and J. Buchli, "End-Effector Pose Correction for Versatile Large-Scale Multi-Robotic Systems," in IEEE Robotics and Automation Letters, vol. 4, No. 2, pp. 546-553, Apr. 2019, doi: 10.1109/LRA.2019.2891499. (Year: 2019).

Philip F. Yuan, Mike Xie, Neil Leach, Jiawei Yao, Xiang Wang. (2020) Architectural Intelligence Selected Papers from the 1st International Conference on Computational Design and Robotic Fabrication (CDRF 2019) 10.1007/978-981-13-8153-9_27. (Year: 2020).

International Search Report and Written Opinion for International Patent Application No. PCT/US2022/53951, dated Apr. 6, 2023.

* cited by examiner

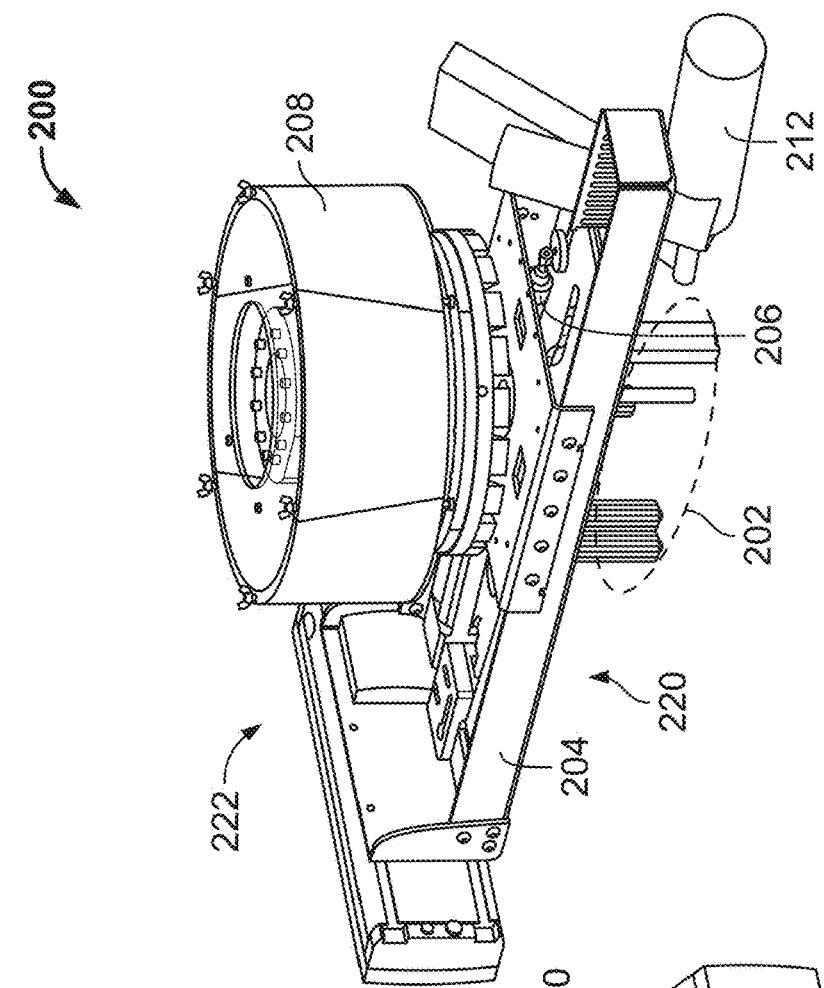
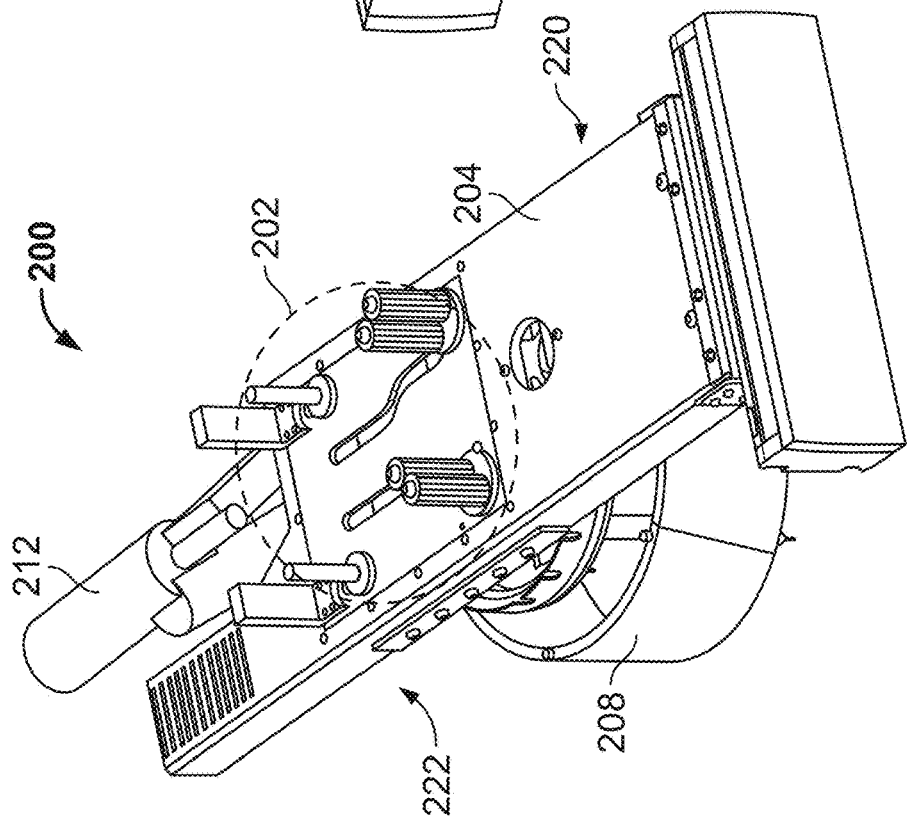
FIG. 2B
FIG. 2A

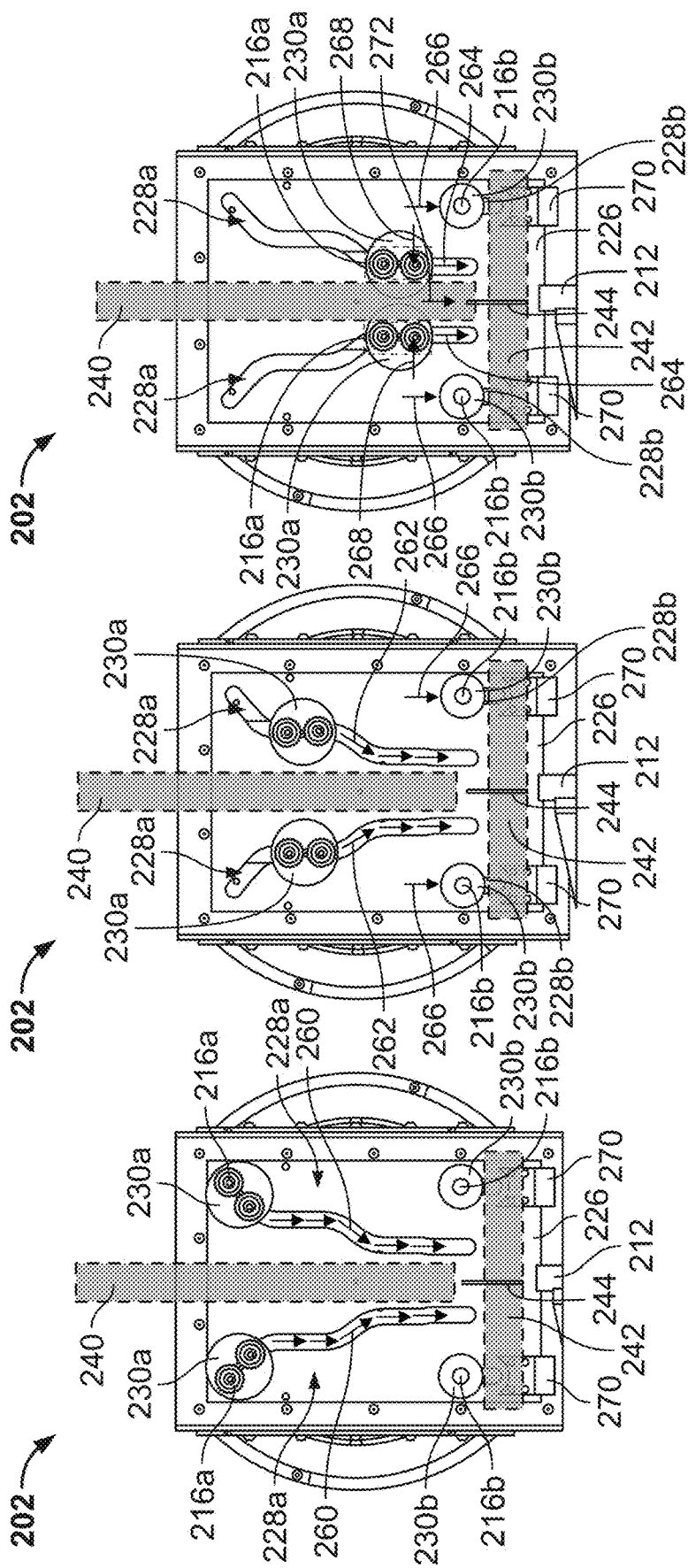

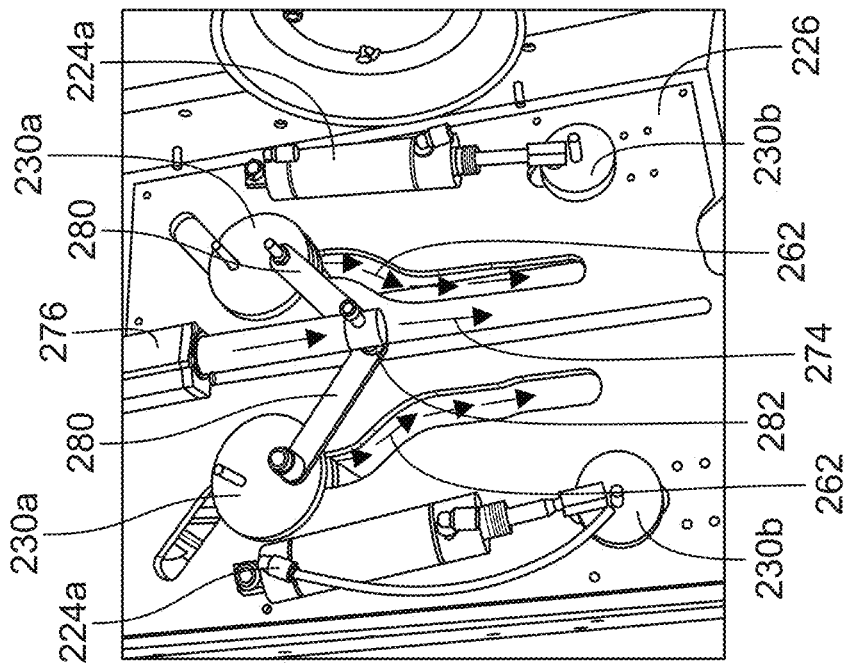
FIG. 3C2
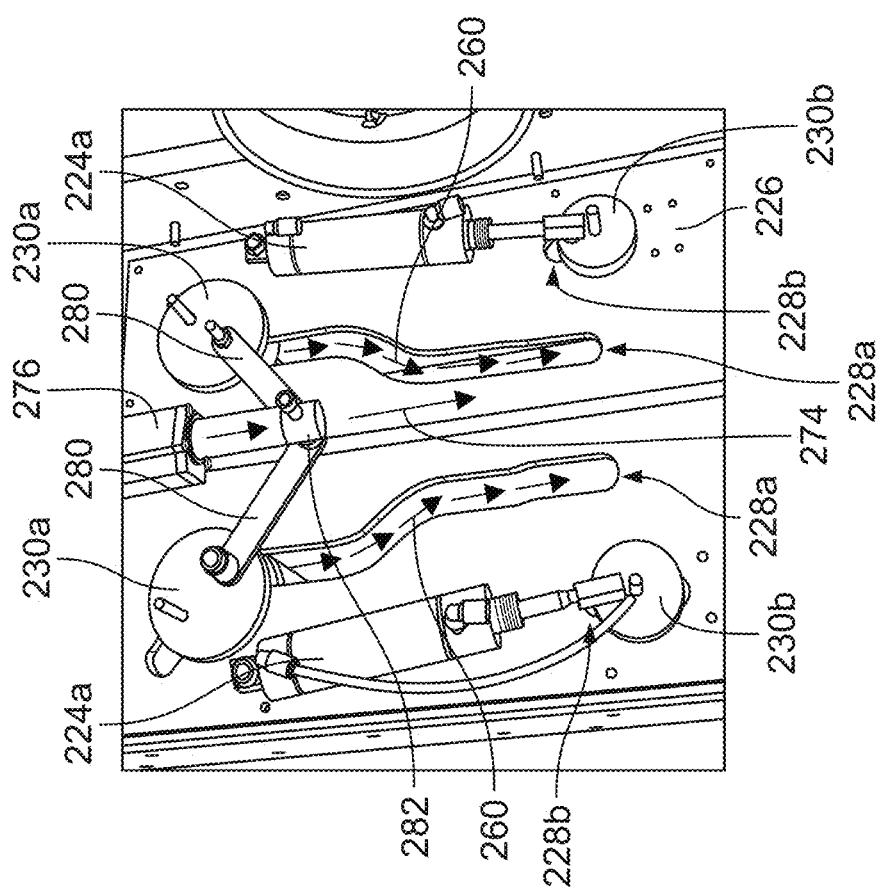
FIG. 3C1

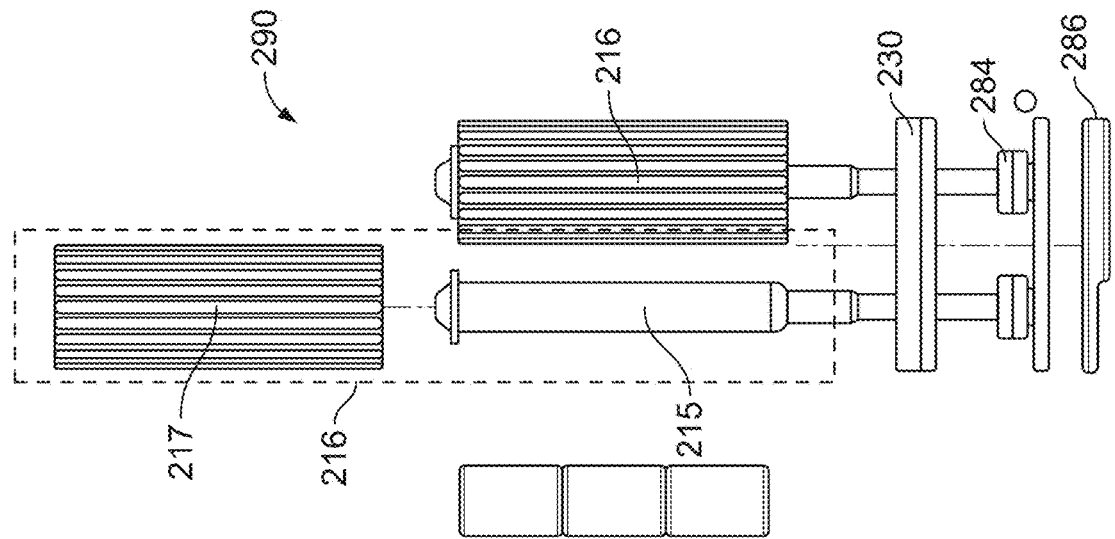
FIG. 3D
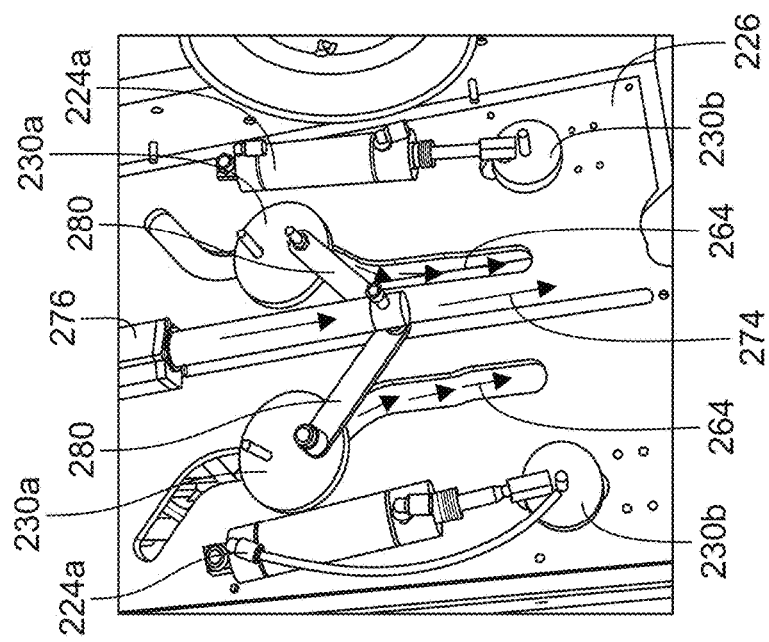
FIG. 3C3

| Features | Description |
|---|---|
| Can be configured to be able to join a stud and a plate together at 90 degrees | A second follower bearing can be added on a carriage including a second line contact point. This can ensure that an end of the stroke and/or a stud can be placed at 90 degrees. |
| Can be configured to be able to hold 900 nails and reload automatically | A nailgun can be used, e.g., a Milwaukee nail gun or a pneumatic nailgun. This can connect with a nail reloading station. |
| Can include a camera and control electronics (Rpi) | The SPC base plate can be configured to fit a camera and control electronics, e.g., a raspberry pi. |
| Can be configured to be powered by a robot | Can include electronics that can bring power and signal wires to the control electronics (e.g., raspberry pi). |
| Can be configured to recover from a nail gun failure | The plate grippers can be configured to retract to remove an affected nail from the system. |
| Nail gun attip the gripper area | One side of the plate gripper can be stationary and not in the path of the gripper area. |
| Can be compatible with kinematic mounts | Space can be allocated for kinematic mounts. |
| Fingers can include a mechanical fuse element | Stationary fingers can be machined to where they break when a big load hits. Alternatively, nylon fasteners can be used. |
| Can be configured to be able to do California intersections | A secondary CAM path can be included to allow California intersections. |
| Can be configured be able to put in 3 nails with even spacing | The nailgun can include an adjustable position and angle to allow for this spacing. |
| Can be configured to be within load tolerance of a toolchanger (0.001 N, 0.001 N-m) | An overall height can be reduced and a nail drum can be moved to a stationary reloading stand to significantly reduce the weight. |

FIG. 3J

| | |
|---|---|
| Can be configured to a position within a 1/16" of the desired position | The CAM follower design can be deterministic, e.g., SPC cam-follower system can be configured to target and/or ensure that the wood and/or board is located at the same position during handling and/or gripping |
| Can be configured to clamp with 250N of force | Can include electric actuators configured to exert 250N of force. |
| Can be configured to pick up a 2x4 up to 10" off center | The stationary grippers can be configured to clamp a 2x4 piece of lumber of up to 10" off center. |
| Can be configured to pick up the full variance of stud widths, approximately: 1.35" to 1.55" | The CAM path can be configured to allow for approximately 1.35" to 1.55" stud widths. |
| Can be configured to clamp an approximately 7" cripple for nailing | The CAM path can be configured to allow an approximately 7" cripple for nailing. Cripple can be displaced from the centerline, e.g., can be displaced approximately 1.5" from the centerline. |
| Can be configured to load up to a 16' 2x12 into the saw and onto the table | Vacuum gripper can be configured to be able to load up to a 16' 2x12 into the saw and onto a table. |
| Can be configured to clamp a stud within up to a 1.5" deviation from centerline | CAM follower can be configured to clamp a stud with within up to a 1.5" deviation from centerline. |
| Can include an indexing tool changer to correct angle and location on the SPC | Indexing pins can be placed in the base which can line up with a moment plate. |

502 — PROVIDE A BASE PLATE HAVING A FIRST CAM SLOT AND A SECOND CAM SLOT, WHERE THE SECOND CAM SLOT IS APPROXIMATELY A MIRROR IMAGE OF THE FIRST CAM SLOT

504 — RECEIVE A FIRST LUMBER VIA A FIRST UPPER CAM-FOLLOWER AND A SECOND UPPER CAM-FOLLOWER, WHERE THE FIRST UPPER CAM-FOLLOWER AND THE SECOND UPPER CAM-FOLLOWER CAN BE WITHIN THE FIRST CAM SLOT AND THE SECOND CAM SLOT, RESPECTIVELY

506 — RECEIVE A SECOND LUMBER VIA A FIRST LOWER GRIPPER AND A SECOND LOWER GRIPPER

508 — HOLD THE SECOND LUMBER IN A PERPENDICULAR DIRECTION WITH RESPECT TO THE FIRST LUMBER USING THE FIRST LOWER GRIPPER AND SECOND LOWER GRIPPER

510 — MOVE THE FIRST AND SECOND UPPER CAM-FOLLOWERS ALONG THE FIRST AND SECOND CAM SLOTS TO HOLD OPPOSITE SIDES OF THE FIRST LUMBER AND MOVE THE FIRST LUMBER TO CONTACT A SECOND LUMBER

512 — USE A BONDING DEVICE TO BOND THE FIRST AND SECOND LUMBER TOGETHER

FIG. 5

SYSTEMS AND METHODS FOR STUD PLATE CONNECTOR MOVEMENT

CROSS-REFERENCE TO RELATED APPLICATIONS

This application is a continuation of U.S. patent application Ser. No. 18/496,815, filed Oct. 27, 2023, which claims priority to and the benefit of U.S. Provisional Application No. 63/420,527 titled "Systems and Methods for Stud Plate Connector Movement" and filed Oct. 28, 2022 which is incorporated herein by reference in its entirety.

TECHNICAL FIELD

The present disclosure generally relates to systems and methods for precise movement and control of a stud plate connector, and more specifically, angled stud placement and attachment to reduce and/or eliminate misalignment by a stud plate connector used in residential, commercial and/or industrial construction applications.

BACKGROUND

Residential home and/or industrial building construction can often be dependent on slow, inefficient, rigid, expensive and manual conventional construction techniques. Some fundamental operations used in construction of a residential home, commercial apartment and/or industrial building can be manual labor intensive and imprecise. Furthermore, conventional construction materials can be limited to specific size requirements, and can also be pre-formed offsite, and when received at the construction site, may not fit or meet the specifications required for its intended use. Additionally, conventional construction techniques that are used for forming such conventional construction materials are often performed offsite from the construction site, or if performed onsite, are manual labor intensive. Conventional preparation of wall frames for use in residential, commercial and/or industrial construction can be a manual process, requiring a lot of human input and can produce imperfections and/or misalignment for one or more features of the wall frame. Specifically, when building a wall and/or wall frame, the placement of a screw and/or stud used for reinforcing a wall frame can be susceptible to misalignment, e.g., due to a bend in one or more wood panel in the wall frame. Therefore, it can be challenging to precisely place, secure and/or align the stud onto a wall frame correctly.

The foregoing discussion, including the description of motivations for some embodiments of the invention, is intended to assist the reader in understanding the present disclosure, is not admitted to be prior art, and does not in any way limit the scope of any of the claims.

SUMMARY

A stud plate connector (SPC) system is presented. In some embodiments, the SPC system can include a base plate having a first cam slot and a second cam slot, where the second cam slot is approximately a mirror image of the first cam slot. The SPC system can include a first upper cam-follower located within the first cam slot. The SPC system can include a second upper cam-follower located within the second cam slot, where the first and second cam-followers hold opposite sides of a first lumber and move the first lumber to contact a second lumber. The SPC system can include a first lower gripper and a second lower gripper for holding the second lumber in a perpendicular direction with respect to the first lumber. The SPC system can include a bonding device located before to the first and second lumber, where the bonding device bonds the first and second lumber together.

Various embodiments of the system can include one or more of the following features.

The first cam slot and the second cam slot of the SPC system can form a "Y" shape, a "V" shape, among other shapes. The first upper cam-follower, the second upper cam-follower, first lower gripper and second lower gripper can include linear rails, cam-sliders, among other exemplary systems. The SPC system can include a first actuator that is configured to and/or moves the first and second upper cam-followers along the first and second cam slots to hold opposite sides of the first lumber and move the first lumber to contact the second lumber. In some examples, the first actuator can be located behind and/or over the base plate. In some examples, a plurality actuators are configured to move and/or are used to move the first lower gripper and a second lower gripper to hold the second lumber in a perpendicular direction with respect to the first lumber. A second actuator of the plurality of actuators can be located adjacent to the first lower gripper, and a third actuator of the plurality of actuators can be located adjacent to the second lower gripper. A second actuator of the plurality of actuators can be located behind the base plate and the first lower gripper, and a third actuator of the plurality of actuators can be located behind the base plate and the second lower gripper. The SPC system can include an encoder for sensing a position of the first upper cam-follower and second upper cam-follower.

A method for joining lumber is presented. The method can include providing a base plate having a first cam slot and a second cam slot, where the second cam slot is approximately a mirror image of the first cam slot. The method can include receiving a first lumber via a first upper cam-follower and a second upper cam-follower, where the first upper cam-follower and second upper cam-follower are within the first cam slot and the second cam slot, respectively. The method can include receiving a second lumber via a first lower gripper and a second lower gripper. The method can include holding the second lumber in a perpendicular direction with respect to the first lumber using the first lower gripper and the second lower gripper. The method can include moving the first and second upper cam-followers along the first and second cam slots to hold opposite sides of the first lumber and move the first lumber to contact the second lumber. The method can include using a bonding device to bond the first and second lumber together.

Various embodiments of the method can include one or more of the following steps.

The method can include the first cam slot and the second cam slot form a "Y" shape, a "V" shape, among other shapes. The method can include the first upper cam-follower, the second upper cam-follower, the first lower gripper, the second lower gripper including linear rails and/or cam-sliders, among other exemplary systems. The method can include a first actuator configured to move and/or that moves the first and second upper cam-followers along the first and second cam slots to hold opposite sides of the first lumber and move the first lumber to contact a second lumber. In some examples, the first actuator can be located behind the base plate, e.g., positioning the first actuator behind the base plate. The method can include providing an encoder for sensing a position of the first upper cam-follower and second upper cam-follower.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIGS. 2A and 2B illustrates a SPC movement system having an exemplary SPC cam slider system, according to some embodiments.

FIGS. 3A1-3A3 illustrate the SPC cam slider system from FIG. 2A-2B is shown, according to some embodiments.

3B illustrates an exemplary SPC cam slider system, according to some embodiments.

Figure 3B:
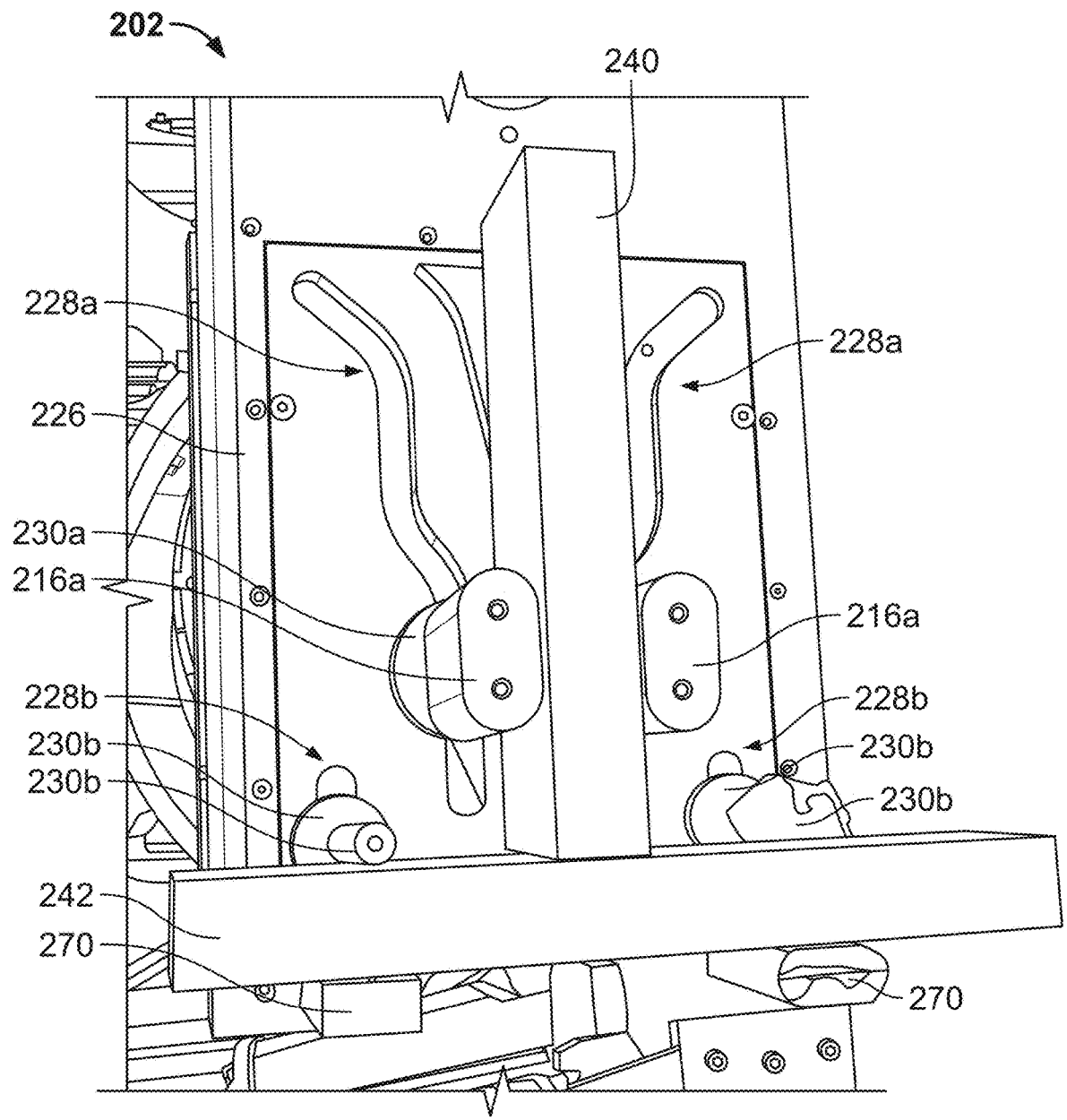

FIGS. 3C1-3C3 illustrate a back side view of the SPC cam slider system from FIGS. 2A, 2B and 3A-3B, according to some embodiments.

FIG. 3D illustrates an exemplary gripper assembly for the SPC cam slider system, according to some embodiments.

Figure 3E:
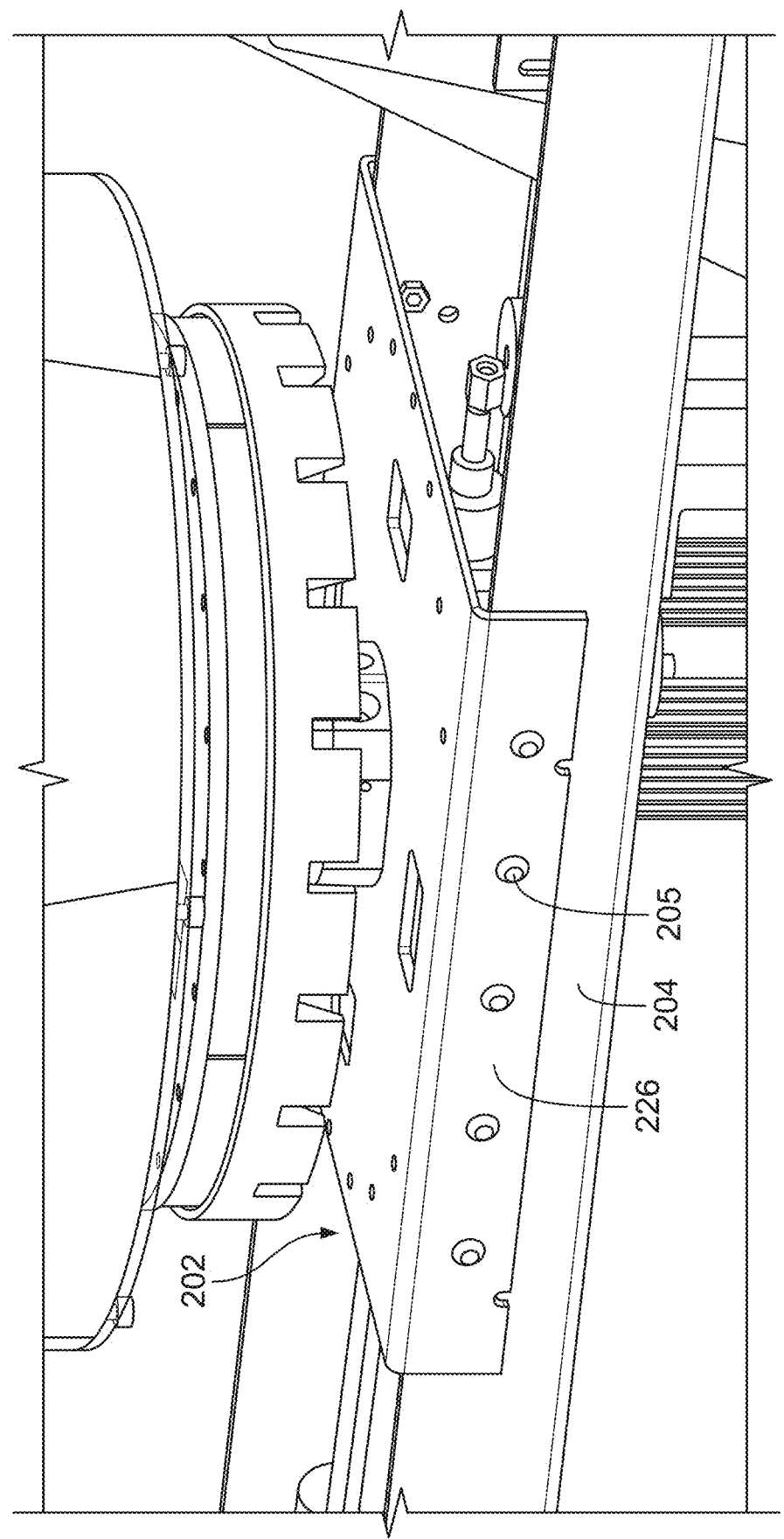

FIG. 3E illustrates an exemplary moment plate connection for the SPC cam slider system, according to some embodiments.

Figure 3F:
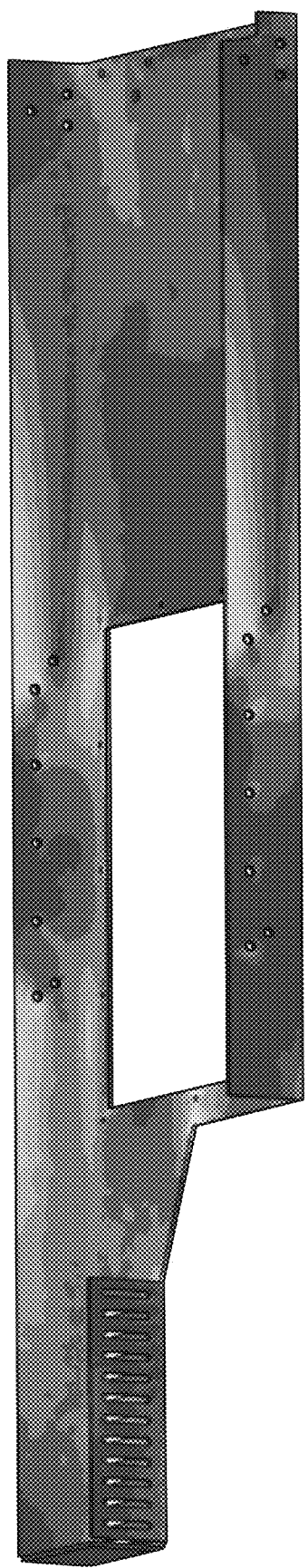

FIG. 3F illustrates an exemplary FEA simulation of a base plate of the SPC cam slider, according to some embodiments.

Figure 3G:
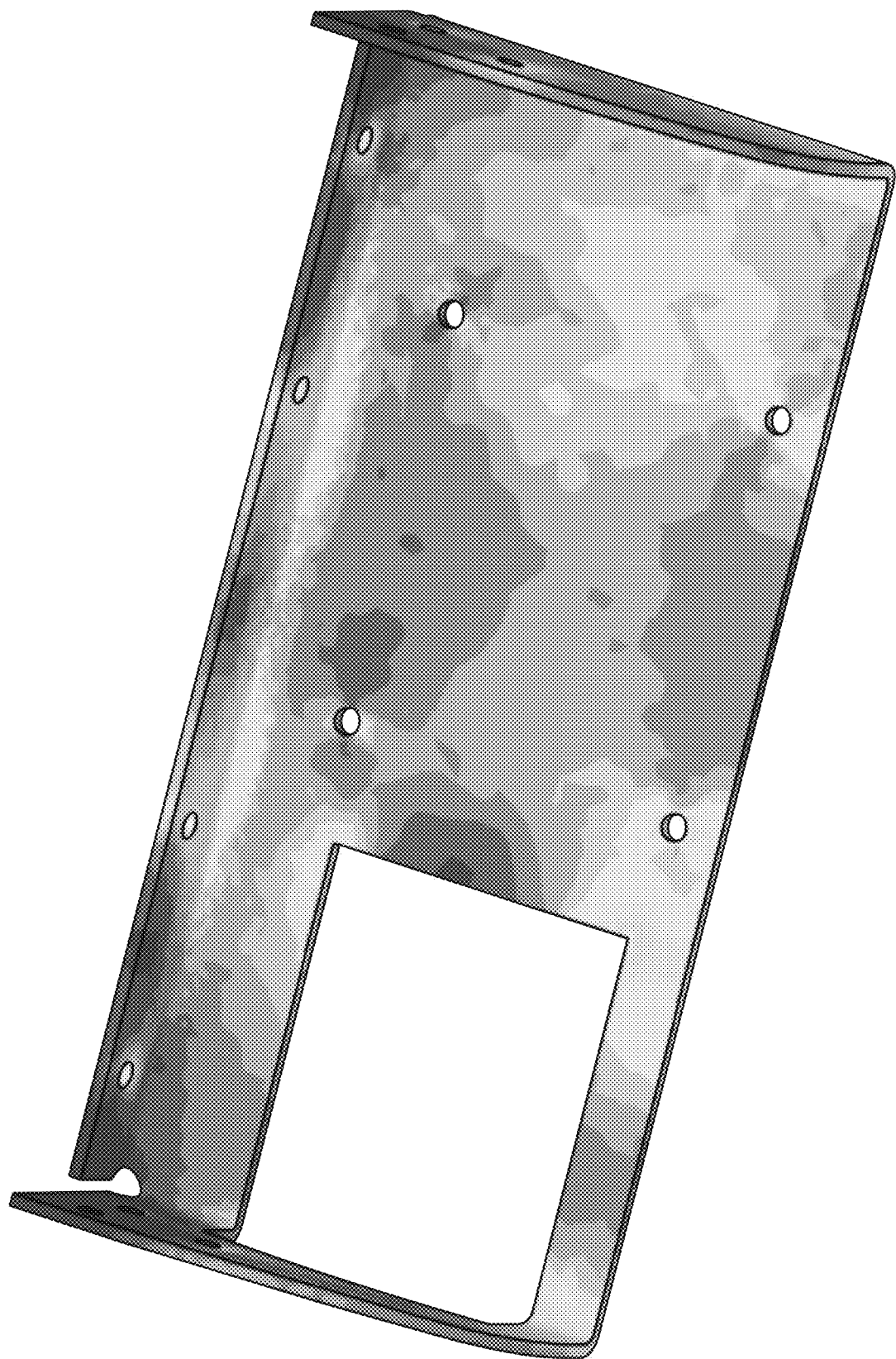

FIG. 3G illustrates an exemplary FEA simulation of a vacuum mount of the SPC cam slider system, according to some embodiments.

Figure 3H:
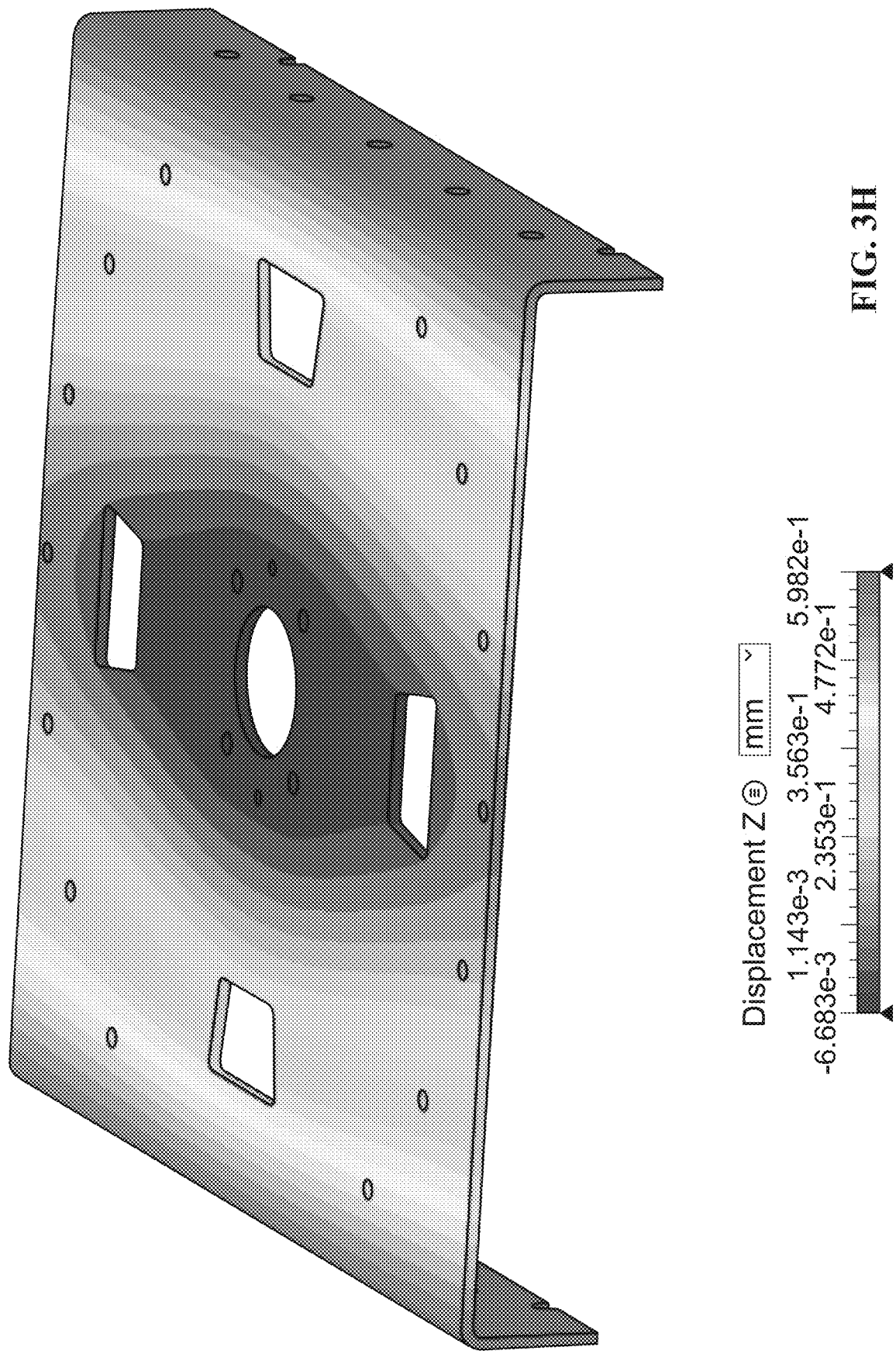

FIG. 3H illustrates an exemplary FEA simulation of a moment plate of the SPC cam slider system, according to some embodiments.

Figure 3I:
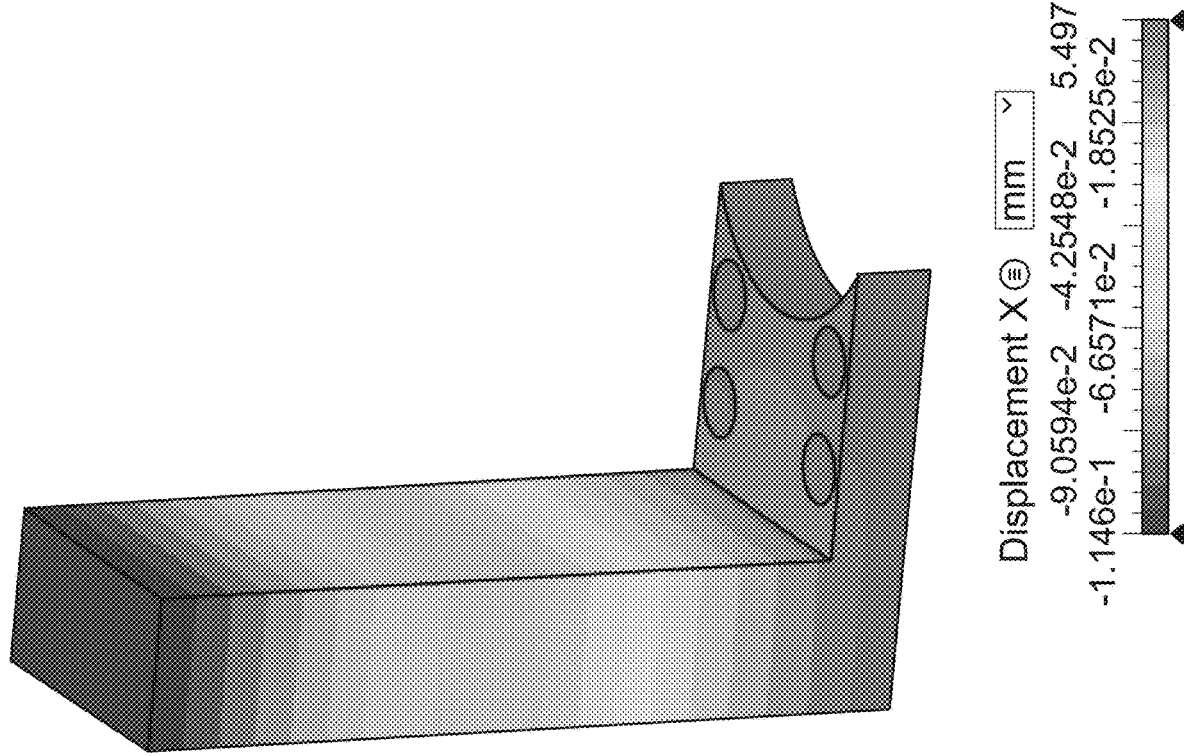

FIG. 3I illustrates an exemplary FEA simulation of a plate stationary gripper of the SPC cam slider system, according to some embodiments.

FIG. 3J illustrates a table listing one or more improved features for a SPC, according to some embodiments.

Figure 4:
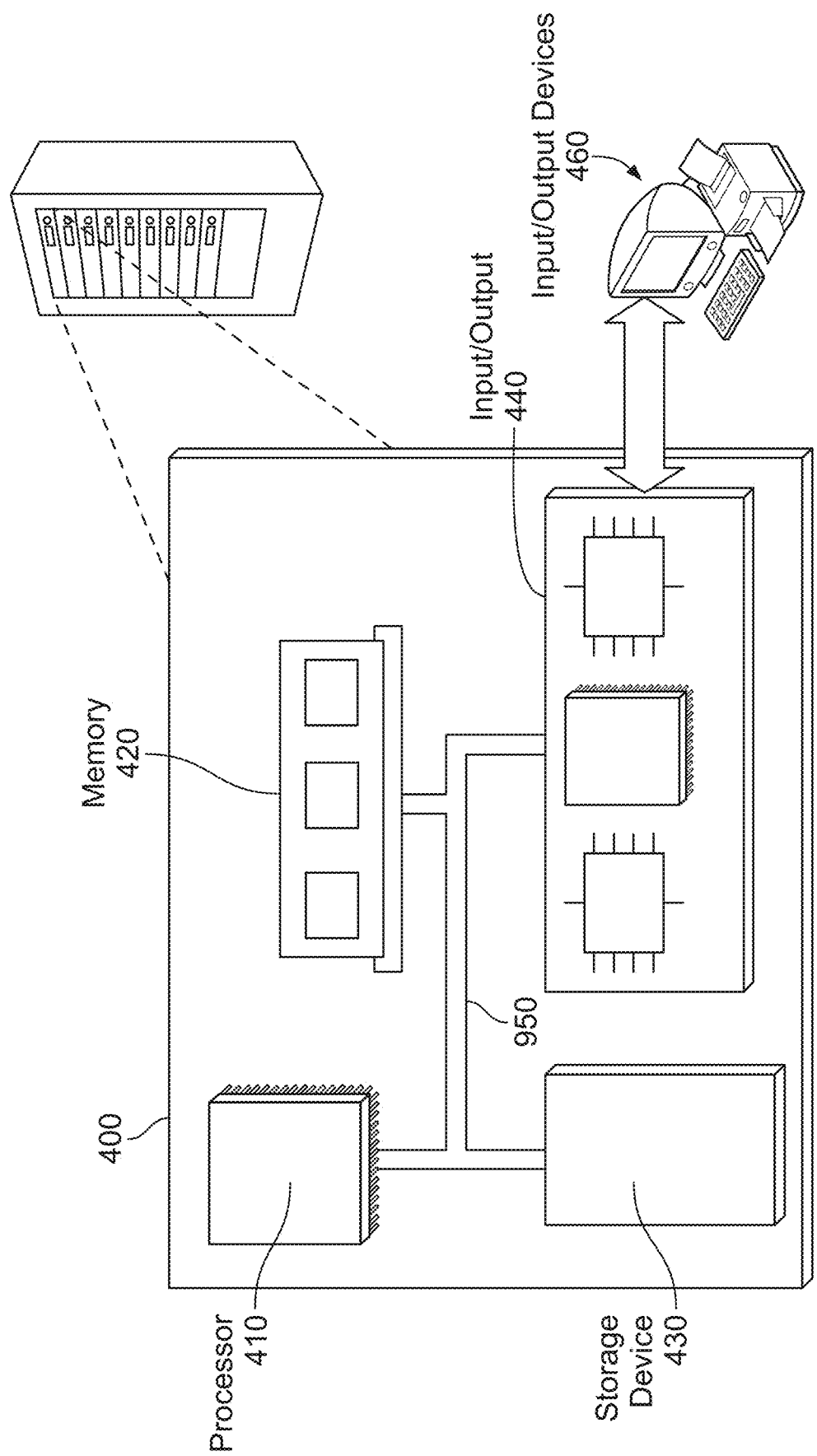

FIG. 4 illustrates a diagram of an exemplary hardware and software systems implementing the systems and methods described herein, according to some embodiments.

FIG. 5 illustrates a flowchart of an exemplary method for joining lumber, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The present disclosure generally relates to systems and methods for automated, fast, efficient, flexible, and/or cost-effective, creation of components for residential, commercial and/or industrial construction. Systems, processes and/or techniques are presented that provide for simplification, and/or decreasing construction time, for residential, commercial and/or industrial building applications. In some instances, systems and techniques for reliably and repeatably forming construction components are presented. Conventional wood gripping systems can usually be limited to use with a narrow range of lumber sizes, e.g., limited to use with specific lumber sizes such as a 2 inch by 4 inch lumber. And such devices that may be flexible enough to be used with a variety of lumber may also be costly and may offer limited benefits over what is currently compatible with a stud plate connector. In some examples, when building a wall having a wall frame, a stud placed on a bottom wood panel of the wall frame may not line up perfectly to a top wooden panel of the wall frame due to a bend in one of the top and/or bottom wood panels. To place and/or nail the stud precisely to the wall frame, in some implementations, a stud plate connector movement system can be used to move a top of the stud parallel to the top and/or bottom wooden panel of the wall frame, without moving an outer portion of the wall frame or the stud plate connector itself. Thus, in some embodiments, a stud plate connector (SPC) movement system is presented herein to address the above challenges.

As used herein, the SPC movement system can be configured to receive lumber, wood, treated wood, wood board, wood stud, stud, wood plate, plate, wood panel, and/or any type of wood which can be used for residential, commercial and/or industrial construction applications. For example, one or more types of lumber, wood, treated wood, wood board, wood stud, stud, wood plate, plate, and/or wood panel can be provided to the SPC movement system as input for processing by the SPC movement system. As used herein, the term lumber can be used to refer to wood, treated wood, wood board, wood stud, stud, wood plate, plate, wood panels, and/or any type of wood which can be used for residential, commercial and/or industrial construction applications. In some examples, the terms lumber, wood, treated wood, wood board, wood stud, and stud, as used herein, can be used interchangeably. Similarly, as described herein, lumber, wood, treated wood, wood board, wood stud, stud, wood plate, plate, wood panel, and/or any type of wood can refer to a single piece of lumber and/or wood, or multiple pieces of lumber and/or wood. In some embodiments, wood studs and/or studs can refer to framing members used in residential, commercial and/or industrial construction. In some examples, the studs can refer to structural wood members that are sawn and/or machine-planed into dimensions of approximately 2 inches by 4 inches, 2 inches by 6 inches, 2 inches by 8 inches, among other dimensions. In some examples, the studs can have a dimension of approximately 1.5 inches by 3.5 inches or 38 millimeters by 89 millimeters. In one example, when used in construction of a wall frame, the studs can be can be spaced apart by 16-24 inches on center along a wall.

Stud Plate Connector (SPC) Movement System Overview

In some embodiments, the SPC movement system can be configured to allow for precise placement and/or movement of studs to a targeted location on one or more wood panels. In some examples, the SPC movement system can be used to provide for an angled stud placement onto the wood panels, e.g., a wood panel and/or lumber on a wall frame. The SPC movement system as a whole can be configured to perform steps and/or functions described herein. The SPC movement system can be used to reduce flexing of lumber when using the SPC to secure a stud to the wood panels. The SPC movement system can be configured to reduce human input and/or control for loading, cutting, and/or processing the wood panels, e.g., providing for a fully automated process. The SPC movement system can place the studs to a targeted location on the wood panels while keeping the wood panels stationary. In some examples, the SPC movement system can place the studs to a targeted location on the wood panels while keeping a wall assembly, and/or stud plate connector of the SPC movement system stationary. The SPC movement system can be configured to move the lumber horizontally, e.g., to move the lumber along a horizontal direction on a work table of the SPC movement system.

In some embodiments, the SPC movement system as a whole can include the following features. The SPC movement system can be configured to include at least a 250 N of clamping force per jaw, e.g., each jaw and/or gripper of the SPC movement system can exert up to approximately 250 N of clamping force. The SPC movement system can have a tolerance of approximately 1/16 inches along a wood panel. The SPC movement system can be configured to tolerate and/or adjust for misalignment, e.g., SPC movement system can adjust for a wood stud misalignment distance and/or misplacement distance of approximately 1.5 inches from a centerline. The SPC movement system can be configured to hold, secure and/or grip the wood panels and/or lumber. In some examples, SPC movement system can clamp, hold, secure, and/or grip wood panels having a thickness in a range of approximately 1.35-1.55 inches. In some examples, the SPC movement system can be configured to accommodate lumber fitting within a range of a sawmill tolerance, e.g., within a range of approximately 1.35-1.55 inches. The SPC movement system can be configured to not generate a moment or load exceeding the SPC movement system's capacity. In one example, the SPC movement system can adjust for loads exceeding SPC movement system's capacity. The SPC movement system, can be configured to be stable, e.g., the SPC movement system can prevent adjacent pieces of lumber from being pushed over and/or knocked down during processing. The SPC movement system can be modular, e.g., the SPC movement system can include more than one module and/or component that together make up the entire the SPC movement system. The SPC movement system can adjust for a deflection of the wood under processing of approximately 1.5 inches per 8 ft. In some examples, the configurations described herein can be used with a piece of wood having a deflection of approximately 1.5 inches per 8 ft. The SPC movement system can include one or more components such as cam-follower system that includes a nail drum, an attachment system, among other components and described in more detail below.

SPC Cam-Follower System

In some embodiments, the SPC movement system can include a cam-follower system that can be used for handling, and/or gripping of studs, and moving the studs into a targeted location (e.g., for securing the studs in place). In some examples, the SPC cam-follower system can be configured to provide deterministic motion, e.g., SPC cam-follower system can adjust a piece of wood such that the wood and/or wood board is located at the same position during handling and/or gripping. In some embodiments, the SPC cam-follower system can be constrained along one or more dimensions e.g., constrained along an X-axis, Y-axis, Z-axis dimension. In one example, the SPC cam-follower system can be configured to allow for X-Y motion using a linear rail from THK company, e.g., coupled with a guide to the cam-follower. In one example, plastic sheets (e.g., Delrin plastic sheets) can be clamped on both sides of a plate of the SPC cam-follower system to constrain movement, e.g., which can allow for the cam-follower to control the motion of the wood without using an additional linear rail.

As used herein, the cam-follower portion of the SPC movement system can be referred to as a SPC cam-follower system. In some examples, there can be different types of cam-followers implemented and/or used. The SPC cam-follower systems can include linear rails, individual tracks, and/or cam sliders. The cam-follower system using the linear rails can be referred to herein as a SPC linear rail system and/or a SPC linear rail assembly. The cam-follower system using individual tracks can be referred to herein as a SPC individual track system. The cam-follower system using cam sliders can be referred to herein as a SPC cam slider system. One or more embodiments of the SPC cam-follower systems are described in detail below.

SPC Linear Rail Cam-Follower System

Figure 1A:
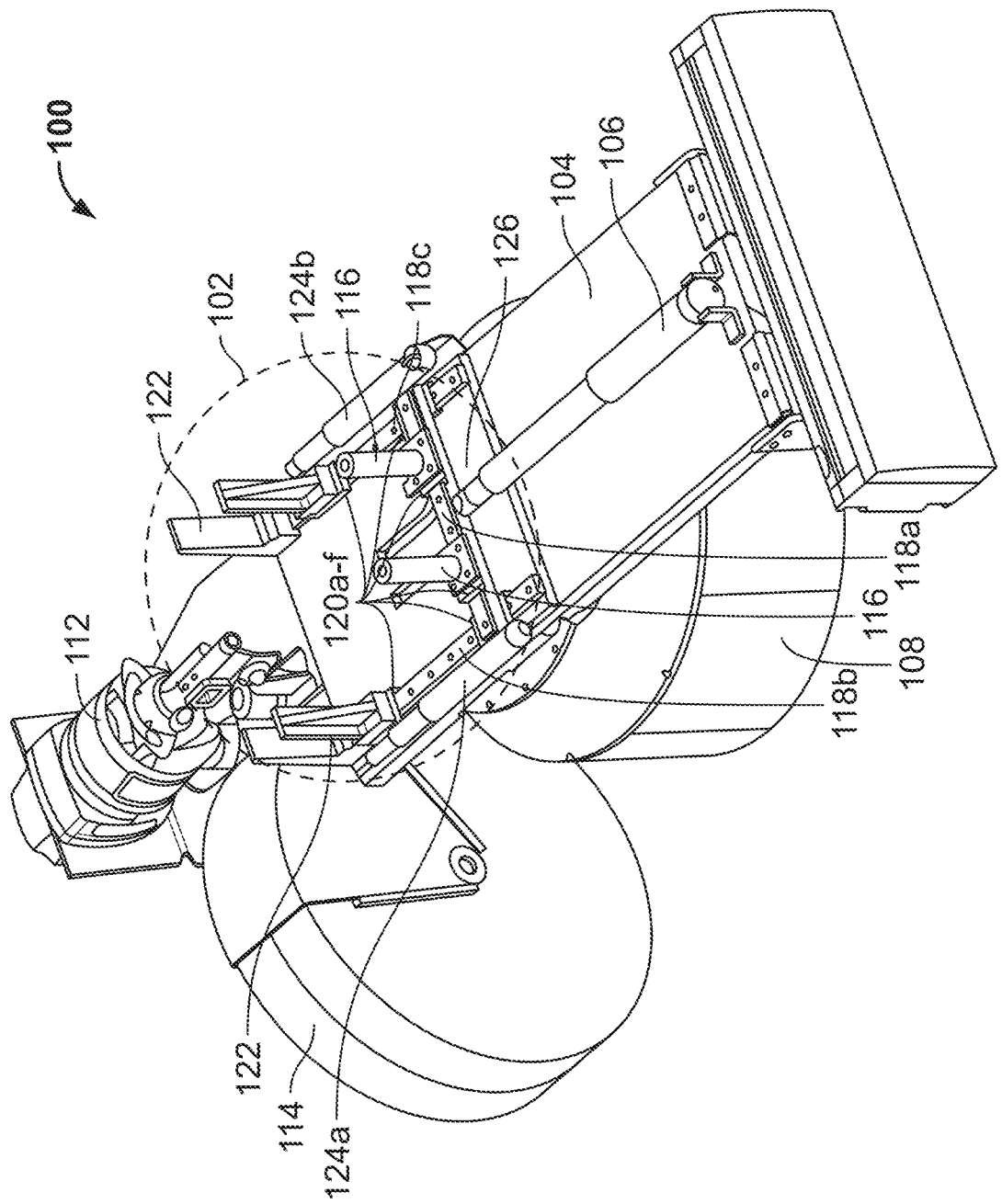
FIG. 1A illustrates a SPC movement system having an exemplary SPC linear rail system, according to some embodiments.

Referring to FIG. 1A, a SPC movement system having an exemplary SPC linear rail system is shown, according to some embodiments. In some examples, the SPC movement system 100 can include a SPC linear rail system 102, a mount 104, one more actuators 106, a base 108, a nail gun 112, a nail drum 114, among other components. As shown, the SPC linear rail system 102 can include contact members 116, rails 118a-118c, carriages 120a-120f, clamps and/or grippers 122, actuators 124a 124b, a base plate 126, among other components. In some examples, the linear rails 118a-118c can be used to move the contact members 116 back and forth, e.g., forward and/or back. The rails 118a-118c can be sealed against dust, and include a slide (e.g., used for moment loads), a low profile (e.g., used reduce moment loads). The rails 118a-118c can be sized and/or proportioned to the SPC linear rail system. The rails 118a-118c can be adjusted to prevent them locking and/or preventing bind-up. The SPC linear rail system 102 can include additional carriages from the carriages 120a-120f. The additional carriages can be adjacent to the existing ones and/or to one another, e.g., to provide additional moment support. The rails 118a-118c can include ball bearing linear rails. The ball bearing linear rails can include a flat mating surface on which to mount the linear rail. The rails 118a-118c can include a reference surface on both sides, e.g., the rails 118a-118c can be secured using clamps to push the rails up against the reference surface, and subsequently screw the rails down.

Although some components are not shown, the SPC linear rail system 104 can include linear rail cars, linear actuators, pneumatic cylinders, one way bearings, cam-follower bearings, and/or a cam-follower system, among other components. In some examples, the SPC linear rail system can include approximately 3 linear rails, approximately 6 linear rail cars, a linear actuator, approximately 2 pneumatic cylinders, approximately 6 one way bearings, and/or approximately two cam-follower bearings. The SPC linear rail system can be configured to grip studs and move and/or place the studs at a designated location on wood plates. The plates can be gripped by a gripper system mounted on the same rail as a stud gripper.

In some embodiments, the SPC linear rail system can include components from the McMaster-Carr company, Misumi company, and/or the Firgelli Automation company, among other vendors and/or suppliers. The SPC linear rail system can include machined parts. The SPC linear rail system can include feedback sensors mounted on linear actuators. The feedback sensors can be configured to limit the stroke, and/or stop the actuator partway through operation. Maintenance can be performed to lubricate rails and carriages of the system. Precision for the SPC linear rail system can be hardcoded into the system through a cam profile. The SPC linear rail system can output and/or exert approximately 150 lb of clamping force and/or approximately 150 lb of pushing force.

Figure 1B:
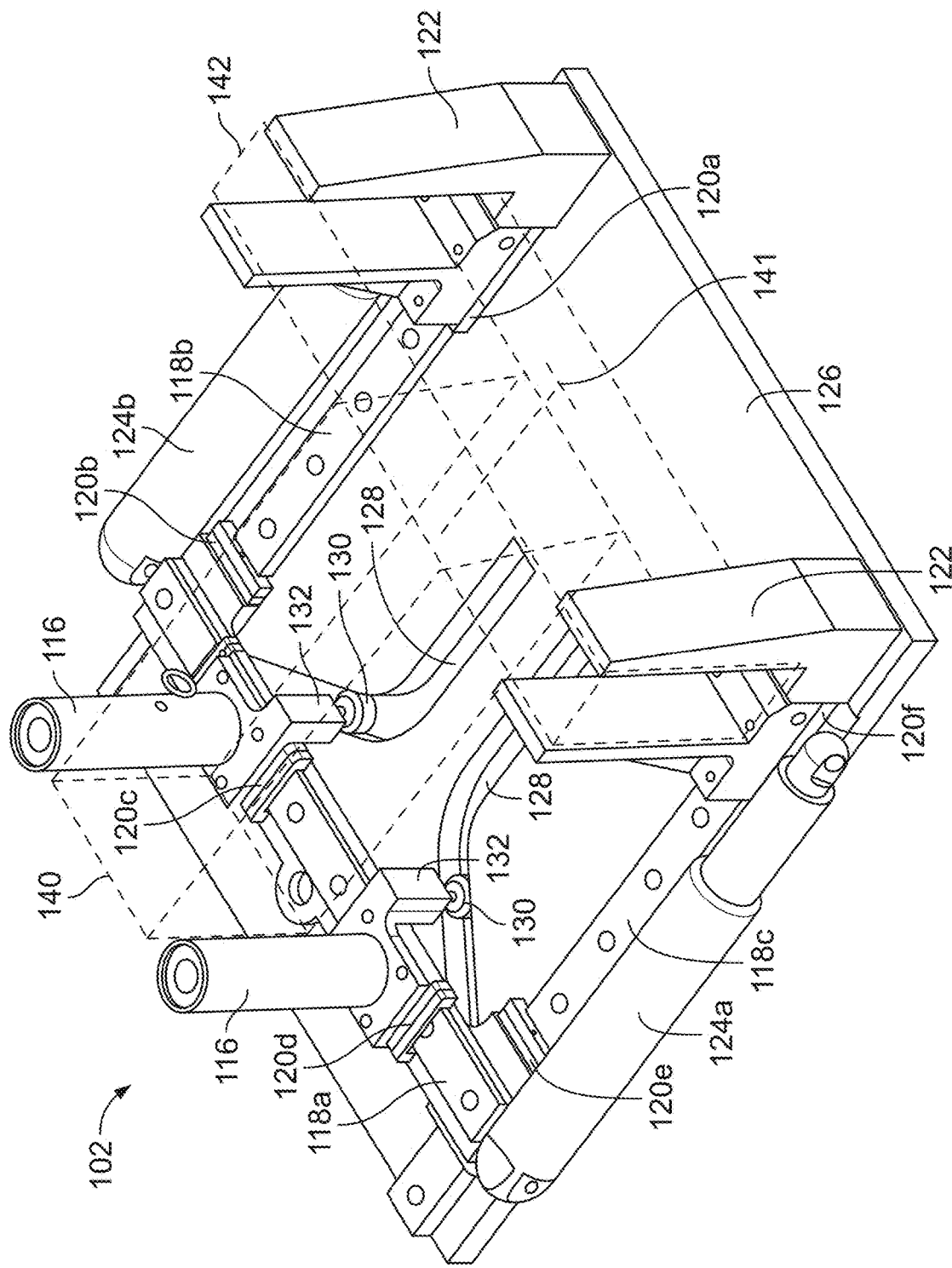
FIG. 1B illustrates a perspective view of the SPC linear rail system from FIG. 1A, according to some embodiments.

Referring to FIG. 1B, a perspective view of the SPC linear rail system from FIG. 1A is shown, according to some embodiments. In some examples, the SPC linear rail system 102 can include contact members 116 (e.g., also referred to as follower guides), a base plate 126 (which can include a sheet metal mount), rails 118a-118c, grippers 122, carriages 120a-120f, and linear actuators 124a, 124b. In some examples, the base plate 126 can include machined steel. The base plate 126 can include cam slots 128 for controlling the movement and/or clamping action of the contact members 116. The base plate 126 can include a machined steel having a top surface milled with a precision of flatness of approximately three decimal places of an inch, e.g., to allow rail contact with the contact members 116. In some examples, the SPC linear rails system 102 can include a crossbeam, and the crossbeam can include machined steel. The grippers 122 can include plate stationary grippers, moving grippers, machined aluminum parts, among other components. The contact members 116 can include follower guides and/or components from Mcmaster company.

In some embodiments, the linear SPC linear rail system 102 can include cam-followers 130 each within opposing, mirrored cam slots 128, e.g., together resembling approximately a "Y" shape as shown in FIG. 1B (also shown in FIGS. 3A-3C). In some embodiments, the linear SPC linear rail system 102 can include a first cam-follower and a second cam-follower 130, as shown. Although the cam slots 128 shown can be in a "Y" shape, other shapes and/or configurations can be used, e.g., a "V" shape. In some examples, the cam-followers 130 can include protruding contact members 116 which can be used to effectively clamp down on opposite sides of a first lumber 140 as the cam-followers 130 move closer together. On an opposite side of the first lumber 140, each cam-follower 130 can be attached to one end of a linear actuator 124a, 124b. In some instances, one end of each actuator 124a, 124b can be pivotally mounted to the base plate and/or bracket 132. Each of the cam-followers 130 can include cam-following pins. The cam-follower pins of each of the cam-followers 130 can be positioned fore and/or aft of the contact members 116, e.g., such that the rotational movement of the cam-following pins within the cam slots 128 are limited and/or controlled. Such a configuration can provide for a flat face toward the wood, e.g., allowing for a uniform clamping on the first lumber 140 and/or wood. In some examples, one or more base plates 126, also referred to herein as brackets, having different shaped cam slots 128 can be used by the SPC linear rail system 102. The base plates 126 can be interchangeable to alter the system's size, and/or clamping angle, among other features. The grippers 122 can be used to securely hold a second lumber 142. The second lumber 142 can be positioned perpendicular to the first lumber 140. FIG. 1B shows the first lumber 140 clamped down and contacting a second lumber 142. FIG. 1B shows the linear SPC linear rail system 102 in a gripping position, e.g., gripping both the first and second lumber 140, 142 in preparation for bonding. In some embodiments, the linear SPC linear rail system 102 can bond the first and second lumber 140, 142 together using a bonding device, e.g., a nail gun. In an example, a nail gun can be used to drive a nail 141 through both the first and second lumber 140, 142 bonding the first and second lumber 140, 142 together. The bonding device can include a nail gun, among other bonding devices and/or fastening devices.

SPC Cam-Follower System with Individual Tracks

In some embodiments, the SPC cam-follower system with individual tracks can include components from the McMaster Carr company. The SPC cam-follower system with individual tracks can include machined parts. The SPC cam-follower system with individual tracks can include plates, bearings, sensors, and/or actuators. The SPC cam-follower system with individual tracks can include a linear actuator. The SPC cam-follower system with individual tracks can include sensors mounted on the linear actuators. Maintenance for the SPC cam-follower system with individual tracks can include occasional lubrication of slots. The SPC cam-follower system with individual tracks can include a bearing material that can slide on the plates, e.g., the bearing material can be configured to allow manual movement along the tracks by a user's hand. Similar to the cam-follower system including the linear rail, the precision for the SPC cam-follower system with individual tracks can be hardcoded into the system. The SPC cam-follower system with individual tracks can be configured to output a clamping force and/or a pushing force of approximately 150 lbf.

SPC Cam Slider System

Referring to FIGS. 2A and 2B, a SPC movement system having an exemplary SPC cam slider system is shown, according to some embodiments. FIG. 2A shows a view from a top side 220 of the SPC movement system 200. FIG. 2B shows a view from a bottom side 222 of the SPC movement system 200. In some examples, the SPC movement system 200 can include a SPC cam slider system 202, a mount 204, one more actuators 206, a base 208, a nail gun 212, among other components. Although some components are not shown, the SPC cam slider system 202 can include follower bearings, linear actuators, framing nailers, cylinders, sheet metal parts, machined parts, hardware components, vacuums, one way bearings, plastic components, among other components. Furthermore, the SPC cam slider system 202 can include approximately 6 follower bearings, approximately 2 linear actuators, at least one framing nailer, approximately 2 cylinders, approximately 3 sheet metal parts, machined parts, hardware components, at least one vacuum, approximately 4 one way bearings, at least one plastic component, among other components. The components for the SPC cam slider system 202 can include components from the Mcmaster company, Misumi company, and/or the Firgelli Automation company, among other vendors and/or suppliers. The SPC cam slider system 202 can be configured to shorten the overall system substantially to reduce the a moment experienced by a tool changer by shortening the system length in comparison to other systems. The SPC cam slider system 202 can be assembled before being installed onto a mount 204 (e.g., the mount 204 also referred to herein as a metal mount or a base plate). The SPC cam slider system can be installed unto the mount 204. The SPC cam slider system 202 can be installed onto the metal mount 204 using screws (e.g., secured by M4 screws) to fasten the system together. In some examples, Twelve M4 screws can be used to fasten the system together.

Referring to FIGS. 3A1, 3A2, and 3A3, the SPC cam slider system from FIG. 2A-2B is shown in three exemplary positions in the process of bonding two pieces of lumber together, according to some embodiments. In some examples, one or more pieces of lumber received by the SPC cam slider system 202 can be referred to as a first lumber 240 and a second lumber 242. FIG. 3A1 shows the SPC cam slider system 202 at a first position where the first lumber 240 and second lumber 242 are received. In some examples, FIG. 3A1 shows the SPC cam slider system 202 in a disengaged pushed out position (e.g., first position). FIG. 3A2 shows the SPC cam slider system 202 at a second position where the cam-followers 230a, 230b are in preparation for clamping onto the first lumber 240 and second lumber 242, respectively. In some examples, FIG. 3A2 shows the SPC cam slider system 202 in a position in preparation to grip the first lumber 240 and second lumber 242. In one example, the second position shown in FIG. 3A2 can allow the SPC cam slider system 202 to grab an approximately 2 inches by 4 inches piece of lumber (e.g., the first lumber 240) when it is laying down on a wide face, and/or when laying down on a thin face, e.g., in preparation to grip a long side and/or edge of the approximately 2 inches by 4 inches piece of lumber. FIG. 3A3 shows the SPC cam slider system 202 at a third position where the SPC cam slider system 202 is clamping the first lumber 240 via the cam-followers 230a, clamping the second lumber 242 via the cam-followers 230b, and moving the first lumber 240 into position against the second lumber 242 to bond the two pieces of lumber 240, 242 together. At the third position, the SPC cam slider system 202 can bond the first and second lumber 240, 242 together through a nail 244 using a bonding device such as the nail gun 212. In some examples, FIG. 3A3 shows the SPC cam slider system 202 in a gripping position, e.g., gripping a short edge of the approximately 2 inches by 4 inches piece of lumber (e.g., the first lumber 240), in comparison to the position shown in FIG. 3A2 where the cam-follower 230a is about to grip a long side of the first lumber 240. Referring again to FIG. 3A3, and as shown, the SPC cam slider system 202 can grip the first lumber 240 and guide the first lumber 240 to contact and/or clamp onto the second lumber 242. The SPC cam slider system 202 can include a base plate 226.

Referring again to FIGS. 3A1-3A3, the SPC cam slider system 202 can include two upper cam-followers 230a each received within opposing, mirrored cam slots 228a. The upper cam-followers 230a are labeled as an upper cam 230a in FIGS. 3A1-3A3, and the cam slots 228a together resembling approximately a "Y" shape and/or a "V" shape. The upper cam-followers 230a (e.g., upper cams 230a) can include contact members 216a which can be configured to clamp down on opposite sides of the first lumber 240 as the cam-followers 230a move closer together. In some embodiments, the cam-followers 230a can include one or more contact members 216a per cam-follower 230a. As shown in FIGS. 3A1-3A3, more than one contact member 216a can be used per cam-follower 230a. In some examples, the first and second positions shown in FIGS. 3A1 and 3A2 show the contact members 216a in the process of clamping together as the cam-followers 230a move closer together. In some examples, the FIG. 3A1 shows a first direction 260 the cam-followers 230a move while the SPC cam slider system 202 is in operation. The cam-followers 230a move in the first direction 260 along the cam slots 228a from an initial position, e.g., the first position described above and shown in FIG. 3A1. In FIG. 3A2, the cam-followers 230a move in a second direction 262 from an intermediate position, e.g., moving 262 from the second position described above and shown in FIG. 3A2. Each upper cam-follower 230a can be referred to herein as an upper cam 230a. In some examples, the contact members 216a of each of the upper cams 230a can clamp 268 from opposite sides of the first lumber 242 as the upper cams 230a move in a third direction 264, e.g., as shown via the third position of FIG. 3A3. A fourth direction 272 represents the overall movement of the first lumber 240 as the SPC cam slider system 202 positions the first lumber 240 to contact the second lumber 242. The SPC cam slider system 202 can include two lower cam-followers 230b, e.g., each labeled as a lower cam 230b in FIGS. 3A1-3A3, and each lower cam-followers 230b having corresponding cam slots 228b. The cam-followers 230b can each be received within corresponding, mirrored cam slots 228b. FIGS. 3A2 and 3A3 shows the lower cam-followers 230b moving 266 toward fixtures 270 to clamp the second lumber 242 in place. The cam-followers 230a move 266 in a fifth direction along the cam slots 228b. Each of the two lower cam-followers 230b can include contact members 216b, and can each be configured to clamp down on the second lumber 242, the second lumber 242 positioned perpendicular to the first lumber 240. In some embodiments, the cam-followers 230b can include one or more contact members 216b per cam-follower 230b. The upper cam-followers 230a, and the contact members 216a together can be referred to as upper grippers, upper gripper assemblies, gripper assemblies, and/or grippers, among other terms. The lower cam-followers 230b, the contact members 216b, and fixtures 270 together can be referred to as lower grippers, lower gripper assemblies, gripper assemblies, and/or grippers, among other terms. As described herein, the contact members 216a, 216b can be referred to as contact members 216. The upper cam-followers 230a, and lower cam-followers 230b, can be referred to collectively as cam-followers 230. Once the first and second lumber 240, 242 are in contact, e.g., as shown in FIG. 3B and described below, the first and second lumber 240, 242 can be bonded together and/or held together using one more one nails 244. As described herein, FIG. 3A can refer to FIGS. 3A1-3A3 collectively.

Referring to FIG. 3B, an exemplary SPC cam slider system is shown, according to some embodiments. Similar to that described and shown in FIG. 3A, the SPC cam slider system 202 includes two upper cam-followers 230a including contact members 216a and two lower cam-followers 230b including corresponding contact members 216. The SPC cam slider 202 includes a cam slots 228a, 228b. In some examples, the cam slots 228a can be in an approximately a "Y" shape, e.g., as shown. Each cam slot of the cam slots 228b can be approximately parallel to each other. As described above, although a "Y" shape is shown, the cam slots 228a can be in other shapes and/or configurations, e.g., in a "V" shape. FIG. 3B shows a first lumber 240 clamped down and contacting a second lumber 242. FIG. 3B shows the SPC cam slider system 202 in the gripping position, e.g., similar to and/or after the third position of FIG. 3A3.

Referring to FIGS. 3C1-3C3, a back side view of the SPC cam slider system from FIGS. 2A, 2B and 3A-3B is shown in three exemplary positions in the process of bonding two pieces of lumber together, according to some embodiments. In some examples, FIGS. 3C1-3C3 show a mechanical synchronization of the SPC cam slider system 202 that can be configured to target and/or ensure that a stud, e.g., a first lumber 240, is placed at approximately 90 degrees to a plate, e.g., a second lumber 242. In one example, the mechanical synchronization shown in FIGS. 3C1-3C3 can prevent part of the system from binding up during operation. In some embodiments, the SPC cam slider system of FIGS. 2A, 2B and 3A-3B can include a mechanical synchronization mechanism configured to synchronize, e.g., that synchronizes, the movement of two upper cam-followers 230a, e.g., via their corresponding contact members (e.g., contact members 216) to grip a piece of lumber (e.g., first lumber 240) and/or to grip two pieces of lumber together (e.g., grip first and second lumber 240, 242 as shown in FIGS. 3A and 3B).

In some examples, a first actuator 276 can be used to synchronize the movement of the contact members 216a of the upper cam-followers 230a, e.g., to move both contact members 216a together at approximately the same time and/or in one smooth movement to clamp onto a first lumber. Actuators 224a can be used to synchronize the movement of the contact members 216b of the lower cam-followers 230b, e.g., to move both contact members 216a together at approximately the same time and/or in one smooth movement to clamp onto a second lumber. The movement of the actuators 244a, 276 can be synchronized to move contact members 216a, 216b together at approximately the same time and/or in one smooth movement to clamp onto both the first and second first lumber, to guide the first lumber to contact the second lumber, and allow for the first lumber and second lumber to be bonded together (e.g., using a nail gun). The SPC cam slider system 202 can include links 280, each link attached to a corresponding contact member 216a. The links 280 can be joined together at an intersection region 282. In one example, intersection region 282 of the links 280 can be constrained to the middle of the base plate 226 of the SPC cam slider system 202 such that when the actuator 276 engages, e.g., pushes out and/or pulls in, the movement of the two contact members (216 shown in FIGS. 2A, 2B, 3A and 3B) are synchronized. The entire assembly of the SPC cam slider system 202 can be powered by an electric or a pneumatic cylinder, e.g., the actuator 276 can include an electric cylinder, a pneumatic cylinder, among others. In some examples, the synchronization can be configured to, e.g., adjusts to, keep a first piece of lumber and/or wood board (e.g., the first lumber 240) perpendicular to a second piece of lumber and/or wood board (e.g., the second lumber 242). In one example, the synchronization can prevent the first and/or second lumber and/or wood board 240, 242 from being pulled off and/or positioned an offset angle, e.g., preventing for example one contact member from moving faster than another contact member. As described herein, FIG. 3C can refer to FIGS. 3C1-3C3 collectively.

The SPC cam slider system of FIGS. 3A-3C can include a multi-layered configuration of materials. In some examples, the multi-layered configuration of materials can include and/or be referred to as a sandwich configuration. In one example, the multi-layered configuration of the SPC cam slider system 202 can include a top plate, a steel shaft, a top plastic guide, a cam-follower plate, a follower bearing, a second plastic guide, and a bottom plate. The top plate can include approximately ¼ inch steel, and can be referred to as a top backing plate 226. The top plate can be placed onto the steel shaft. The steel shaft can include two distinct zones, a first zone and a second zone, and can be threaded evenly to prevent jamming during assembly. The steel shaft can include a shoulder in the middle of the steel shaft to separate these two zones (e.g., the first and second zones). The top plastic guide can be placed onto the steel shaft and be located adjacent to the top plate. Referring to FIGS. 3A and 3C, the follower bearing, e.g., cam-followers 230a, can be inserted into the cam slots 228a of the cam-follower plate 226, e.g., onto a steel shaft, as it is pushed through the cam slots 228a. As shown in FIGS. 3A and 3C, the cam-followers 230b and the cam slots 230b can be similarly configured. The steel shaft can be placed onto the cam-follower plate 226. The cam-follower plate 226 can be placed onto the second plastic piece, e.g., the cam-follower plate can be placed between the first and second plastic piece. The second plastic piece can be placed onto the bottom plate.

Systems and techniques for using a vision system for aligning two or more pieces of lumber together described in U.S. patent application Ser. No. 18/088,201 titled "Systems and methods for a stud plate connector end effector" and filed Dec. 23, 2022 which is incorporated herein by reference in its entirety. In some examples, the vision system can be used to align the first lumber 120, 220 described above with the second lumber 122, 222 as part of, and/or in coordination with, the systems and methods described in here, e.g., the systems of FIGS. 1A, 1B, 2A, 2B, 3A1-A3, 3B, and 3C1-C3 and method of FIG. 5.

SPC Gripper Assembly and Components

Referring to FIG. 3D, an exemplary gripper assembly for the SPC cam slider system is shown, according to some embodiments. As shown, the gripper assembly 290 can include a contact member 216. The contact member 216 can include a steel shaft 215 placed on the cam-follower plate 230, one way guide bearings 284 can be inserted onto the steel shaft. A M6 screw and/or a washer can be used to fasten the one way bearings 284 to the steel shaft 215. A gripper 217 can be slid on top of the bearings through the shaft 215, e.g., via shrink wrap.

Referring to FIG. 3E, an exemplary moment plate connection for the SPC cam slider system is shown, according to some embodiments. In some embodiments, in contrast to using a circular moment plate, a circular pattern of the supports can be patterned onto a square plate 226. To allow the plate 226 to be placed on the correct orientation, four locating pins can be placed in the base plate 226. In some examples, the four locating pins 205 are located along the perimeter of 202 and align into the mount 204. The four locating pins can slide into the moment plate 226 before screwing and/or securing the moment plate assembly.

Referring to FIGS. 3F, 3G, 3H and 3I, exemplary FEA simulations of several components for a SPC cam slider system are shown, according to some embodiments. In some examples, a model made using plasma cut steel was performed to analyze the feasibility of using a slider and cam-follower mechanism together to grip wood.

Referring to FIG. 3F, an exemplary FEA simulation of a base plate of the SPC cam slider system is presented, according to some embodiments. In some examples, provided an approximately 200 lb load applied to both a nail gun mount and a vacuum mount, an approximately 1 mm deflection can be observed at a very tip of a side of a nail gun of the SPC slider system. In one example, a side of a vacuum gripper of the SPC cam slider system can have an approximately 0.1 mm of displacement.

Referring to FIG. 3G, an exemplary FEA simulation of a vacuum mount of the SPC cam slider system is presented, according to some embodiments. In some examples, provided an approximately 250 lb load and based on the FEA analysis, a vacuum gripper of the SPC cam slider system can have at most approximately 10 microns of deflection.

Referring to FIG. 3H, an exemplary FEA simulation of a moment plate of the SPC cam slider system is presented, according to some embodiments. In some examples, provided an approximately 200 lb load applied to both sides and based on the FEA analysis, the vacuum mount of the SPC cam slider system can have a deflection of at most approximately 0.6 mm and/or lower.

Referring to FIG. 3I, an exemplary FEA simulation of a plate stationary gripper of the SPC cam slider system is presented, according to some embodiments. In some examples, provided an approximately 200 lb load and based on the FEA analysis, the plate stationary gripper can be deflected by approximately 1 micron.

In some embodiments, for the SPC cam slider system can include a stud gripper shaft. Based on a fixed support beam deflection equation for a millimeter-based shaft, the stud gripper shaft can deflect approximately 0.7 mm at the top of the stud gripper shaft.

In some embodiments, one or more of the above described tests and/or embodiments were analyzed and/or validated using a plasma cut steel test piece.

In addition to the one or more embodiments for the SPC movement system described herein, an improved SPC can also be used with the SPC movement system. Features and methods related to an improved SPC to be used with the SPC movement system is described in detail below.

Table Listing of SPC Features

Referring to FIG. 3J, a table listing one or more improved features for a SPC is shown, according to some embodiments. In some embodiments, the SPC can be configured to join studs and wooden plates together. In some examples, the SPC can be configured to join the studs and the wooden plates together at an angle of approximately 90 degrees. The SPC can include a second follower bearing added on a carriage of the SPC including a second line contact point. The second follower bearing added on the carriage of the SPC can ensure that at one end of a stroke of the stud can be placed at 90 degrees. In some implementations, provided an exact cam profile may not be applicable, a new profile can be used and/or replaced with a previous profile. In some implementations, cam profiles, e.g., such as the new cam profile described previously, can be quickly created, produced and/or manufactured on a CNC milling machine. The SPC can be configured to hold nails. The SPC can be configured to hold approximately 900 nails. The SPC, can be configured to reload the nails automatically. The SPC can include an electric nail gun, a pneumatic nail gun, among other types of nail guns. The SPC can include a nail gun from the Milwaukee company, among other vendors and/or suppliers. The nail gun of the SPC can be configured to attach, mate and/or couple to a nail reloading station. The SPC can include cameras and/or electronics devices. The electronic devices can include a raspberry pi. The camera and/or electronics device can be located on a base plate of the SPC. The SPC can be powered by an automated component.

In some embodiments, the SPC can be powered by a robotic arm of the SPC. The SPC can include an electronics box, e.g., which can also be referred to herein as an E-box, which can be configured to provide power and/or signal wires to the electronic device (e.g., raspberry pi). The SPC can be configured to recover from failure of an included nail gun. Plate grippers can be configured to retract to show nails that can be removed and/or replaced. The plate grippers can be configured to move and/or expose nails for replacement. A tip of the nail gun can be configured to be at a location other than in the area of and/or in the vicinity of the grippers. The sides of the plate gripper can include stationary clamping portions, e.g., one or more stationary aluminum pieces that the wood and/or wood plate is pressed into by the upper cams as shown in FIG. 3B.

In some embodiments, the SPC can be configured to be compatible with kinematic mounts. The SPC can have allocated portions for the kinematic mounts. The SPC can include fixtures 270 and/or fingers, e.g., the wedge shaped pieces shown in FIGS. 3A and 3B. The fingers can include a mechanical fuse element. The SPC can be configured to perform California intersections, e.g., an approximately 2 inches by 4 inches piece of lumber can be joined to another approximately 2 inches by 4 inches piece of lumber to create an "L" shape. A secondary cam path can be added and/or included to allow for the SPC to perform a California intersection.

In some embodiments, the SPC can be configured to place nails with even spacing between each nail. The SPC can be configured to place 3 nails with evening spacing between each nail. The nail gun of the SPC can include an adjustable mechanism to allow for even placement and/or spacing between individual nails. The nail gun can include an adjustable position and/or angle to allow for even placement and/or spacing between nails. An overall height of the SPC can be reduced to allow for the approximate tolerance. The SPC can include a nail drum. In some examples, the nail drum 114 shown in FIG. 1A. The nail drum can be located to a stationary reloading stand to substantially reduce the weight of the overall SPC. The SPC can be configured to be positioned to a precision of approximately $1/16$ inches of a targeted position. The tolerance of robotic components of the SPC can determine the tolerance of the stud placement.

In some embodiments, the SPC can have a clamping force of approximately 250 N. Actuators, e.g., electronic and/or pneumatic actuators, can be used to produce a clamping force of approximately 250 N. In some embodiments, the actuators can include the actuators 106, 124a, 124b of FIG. 1A, 1B, and/or the actuators 276, 224a of FIGS. 3C1-3C3. In some examples, the actuators 106, 124a, 124b, 276, 224a, can include an encoder for, and/or to allow sensing a position of one or more cam-followers. The actuator 106 can include a corresponding encoder to determine the position of the cam-followers 130 within the cam slots 128. The actuator 276 can include a corresponding encoder to determine the position of the cam-followers 230a within the cam slots 228a. The actuators 224a can include a one or more encoders to determine the position of the lower cam-followers 230b within the cam slots 228b. The SPC can be configured to pick-up and/or place lumber having dimensions of approximately 2 inches by 4 inches up to 10 inches from a center of the lumber. Stationary grippers can be configured to, and/or used to, clamp lumber having dimensions of approximately 2 inches by 4 inches up to 10 inches from a center.

In some embodiments, the SPC can be configured to use and/or select between the studs having varied widths. The SPC can be configured to use and/or select between the studs having widths within a range of approximately 1.35 inches to 1.55 inches. A cam path of the SPC can be configured to allow for variation in the stud width dimensions, e.g., the studs having widths within a range of approximately 1.35 inches to 1.55 inches. The SPC can be configured to clamp a 7 inch cripple for nailing. The cam of the SPC can be configured to allow clamping the 7 inch cripple for nailing. The cam path can be configured to displace the cripple approximately 3 inches from a centerline. The cam path can be configured to allow for displacing the cripple at a full 1.5 inches. The SPC can be configured to load lumber having dimensions of approximately 16 ft 2 inch by 12 inches into a saw and onto a table.

In some embodiments, a vacuum gripper of the SPC can be used to load lumber having dimensions of approximately 16 ft 2 inch by 12 inches into a saw and onto a table. The SPC can be configured to clamp a stud within at least 1.5 inches from a centerline of a wood panel and/or a piece of lumber. The cam-follower, e.g., the cam-followers from the cam-follower systems described herein, coupled with the SPC can be used to clamp the stud within at least 1.5 inches from the centerline of the wood panel and/or the piece of lumber. The SPC can include an index tool changer to adjust for and/or correct an angle and/or location on the SPC.

Table Listing Exemplary SPC Movement Systems

In some embodiments, the SPC movement system can include at least one of a SPC gripper system, a SPC cam-follower system, a SPC cam-slider system, among other systems. In some examples, the SPC gripper system can include a gripper. The SPC cam-follower systems can include linear rails and/or individual tracks. Each of these systems, either together or individually, can be configured to allow for precise placement and/or movement of studs to a targeted location on the wood panels.

SPC Gripper System

As described above, the SPC movement system can include a gripper system for handling and/or controlling the grippers used by the SPC movement system. As used herein, the gripper portion of the SPC movement system can be referred to as a SPC gripper system. One or more embodiments of the SPC gripper system are described in detail below.

In some embodiments, the SPC gripper system presented herein can include grippers. In some examples, the grippers can include an electric, vacuum, and/or pneumatic gripper. The SPC gripper system can include a custom gripper, e.g., such as a gripper having a wider range of motion as compared to other gripper configurations. The SPC gripper system can include a modular gripping system. The SPC gripper can be configured to provide feedback on the SPC gripper's position, and applied force, among other gripper properties, e.g., when using an electric SPC gripper.

In some embodiments, the SPC gripper system can include grippers, valves, and/or springs. The SPC gripper system can include proximity sensors. The SPC gripper system can include 3D printed adapters, valves, and/or one more IO ports. The precision of SPC gripper system can vary based on the robots, e.g., robotic arms, used. The SPC gripper system can have an increased movement and/or gripping precision based on a particular gripper used. In some examples, the SPC gripper system can be configured to output an approximately 608 N clamping force.

In some embodiments, provided a maximum deflection of approximately 1.5 inches per 8 ft, one or more configurations for the SPC gripper system can be used. In one example, the SPC gripper system can be configured to move the centerline of the wood into position using a gripper, and subsequently move the wood back into position with a separate actuator, e.g., such as a linear rail using the same and/or a single gripper. The SPC gripper system can include a gripper having a target stroke to accommodate the full range of possible stud positions. Within a target clamping force, the SPC gripper system can be configured to adjust, push and/or exert the target force to position and/or locate studs in a designated and/or preferred location. Custom grippers can be used, in one example, the SPC gripper system can use specific grippers configured to accommodate a wider range of wood positions.

In some embodiments, the SPC gripper system can include jaws for securing wood panels and/or lumber. In some examples, to adjust and/or prevent pushing over adjacent lumber when opening the jaws of the SPC gripper system, one or more configurations described herein can be used. The SPC gripper system can include a ratcheting mechanism. The ratcheting mechanism can include flipping and/or opening the jaws out of the way when the grippers are opened. The jaws may also not be opened all the way until clear of adjacent and/or potentially obstructing lumber. The SPC gripper system can be configured to relieve the pressure on a closing port. Relieving the pressure can include the SPC gripper system not turning on ports that are labeled 'open' until the lumber and/or wood has been cleared from potentially obstructing the jaws. The SPC gripper system can use a spring assist to relieve pressure from the closing port of the SPC gripper system. This spring assist can be configured to provide a target force that does not substantially reduce the closing force of the system. The target force can include approximately 60N. The spring assist can be configured to overcome a stiction of the system, e.g., to provide a force that overcomes a static friction of the system, and/or that is greater than a sliding friction of the system. The SPC gripper system can be configured to adjust and/or limit a flowrate of the jaws from opening such that at least one jaw opens slowly, giving ample duration for the lumber to move out of the way. The SPC gripper system can include an electric gripper and/or a servo control, e.g., using the electric gripper and/or servo control together. The electric gripper and/or servo control can be used to open the jaws, e.g., control the speed of one or more jaws using the electric gripper and/or servo control. The electric gripper and/or servo control can be used to open the jaws slow enough to provide an ample duration for the lumber to move out of the way. The SPC gripper system can be configured to control and/or limit how far a gripper opens, e.g., using an electric actuator to control and/or limit how far the gripper opens. To receive an indication that the lumber has was successfully gripped, the SPC gripper system can use proximity sensors to detect the presence of the lumber. The proximity sensors can be connected to and/or on the jaws. The jaws can determine if wood is present in the correct location, e.g., using sensors to detect the wood and/or lumber. The sensors can include the proximity sensors. The sensors can include a laser distance sensor, a load measurement sensor, a capacitive sensor, a single unit optical proximity sensor, and/or any other types of sensors. The SPC gripper system can be configured to use the laser distance sensor to detect if an object is blocking the jaw. In one example, if an object obstructs a laser beam from reaching the laser distance sensor, an obstructing object (e.g., lumber) can be determined to be detected. The laser distance sensor can include a transmitter and/or a receive component. The distance sensor can be a component from the brand Keyence. The SPC gripper system can include load measurement sensors including strain gauges. The strain gauges can be mounted on the jaws. The strain gauge can include a separate amplifier. The SPC gripper system can include capacitive sensors. The capacitive sensors can be mounted on the jaws. The capacitive sensors can be configured to detect pieces of lumber. The capacitive sensor can include an automatic load detection PNP/NPN capacitive sensor. The capacitive sensor can include a capacitive sensor from IFM company. The SPC gripper system can include a single unit optical proximity sensor. The single unit optical proximity sensor can be configured to detect the presence of wood before clamping down with the SPC gripper system.

In some embodiments, the SPC gripper system can include valves, sensors, cords, gripper jaws, mechanical adapters, springs, countersunks, hex caps, among other components and/or features. In some examples, the SPC gripper system can include at least one valve, at least two sensors, at least two gripper jaws, at least one mechanical adapter, at least one spring, among other components. The sensors can include optical sensors. The SPC gripper system can include cords for the optical sensors. The mechanical adapter can include an adapter for a Schunk slide. The SPC gripper system can include components from the McMaster company, IFM company, Schunk company, Festo company, PHD company, TheSpringStore, among other vendors and/or suppliers.

In some embodiments, as shown, the SPC gripper system can include a modified linear slider mounting system. The SPC gripper system can include robotic arms made out of sheet metal or welded plate. The SPC gripper system can be made using a fast fabrication, and/or inexpensive components. The SPC gripper system can reduce fabrication time and/or reduce component costs by using a robotic arm can be created using two pieces of ¼ inch steel plate welded together into one gripper arm. The SPC gripper system can include a pneumatic control valve and/or a multi-piston control valve. The SPC gripper system can include a pneumatic control valve with a neutral point in the middle. In one example, in order to create a situation where the gripper is neither being forced out or in, the pneumatic control valve on the robotic arm can be replaced by a three position valve. Replacing the pneumatic control valve with a three position valve can reduce the number of input output (IO) ports used. Furthermore, the SPC gripper system can include grippers having a disc spring.

In some embodiments, various features of the SPC gripper system can be adjusted. In some examples, when fully closed, a gripper of the SPC gripper system can have a gap of approximately 1.35 inches. In one example, when fully closed the gripper can be less than 1.5 inch width of a standard lumber size, e.g., a lumber size including approximately 2 inches×4 inches. When fully extended, the SPC gripper system can have an extended distance of approximately 5.83 inches. In contrast to extending the gripper, the range of the gripper can be reduced. The range of the gripper can be reduced using an OEM stroke reduction device. In order to lift off a stud without knocking over adjacent studs, in one example, a spring internal to the gripper can be added to move grippers slightly off the stud before moving the robotic arms. The SPC gripper system can include on or more sensors, e.g., for sensing of wood. Furthermore, an optical reflection sensor can be used. The optical reflection sensor can combine a transmitter and/or a receiver into a single unit, and can include a simple interface with an NPN output. An output of the optical sensor and/or SPC gripper system, can be read by electronic boxes and/or computer systems. In one example, the electronic boxes and/or computer systems can include a raspberry pi, among other electronic and/or computing devices.

In some embodiments, the SPC gripper system can include a conical spring. In some embodiments, a gripper with a breakaway force of approximately 56 N, or 12.6 lbf can be used. A conical spring can be used that can provide the breakaway force at the maximum compression of the spring. In some examples, the SPC systems described herein can include a gripper having bearings and/or a sleeve Hardware and Software Implementations FIG. 4 is a block diagram of an example computer system 400 that may be used in implementing the technology described in this document. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, for example as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; and magneto optical disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Methods for Joining Lumber

Referring to FIG. 5, a flowchart 500 of an exemplary method for joining lumber is shown, according to some embodiments. In a step 502, a base plate can be provided having a first cam slot and a second cam slot, where the second cam slot is approximately a mirror image of the first cam slot. In a step 504, a first lumber can be received via a first upper cam-follower and a second upper cam-follower, where the first upper cam-follower and second upper cam-follower can be within the first cam slot and the second cam slot, respectively. In a step 506, a second lumber can be received via a first lower gripper and a second lower gripper. In a step 508, the second lumber can be held in a perpendicular direction with respect to the first lumber using the first lower gripper and a second lower gripper. In a step 510, the first and second upper cam-followers can be moved along the first and second cam slots to hold opposite sides of the first lumber and move the first lumber to contact the second lumber. In a step 512, a bonding device can be used to bond the first and second lumber together. In some examples, the first cam slot and the second cam slot form a "Y" shape and/or "V" shape. The first upper cam-follower and the second upper cam-follower include linear rails. The first upper cam-follower and the second upper cam-follower include cam-sliders. The first lower gripper and the second lower gripper include linear rails. The first lower gripper and the second lower gripper include a cam-sliders. In some examples, a first actuator can be configured to move the first and second upper cam-followers along the first and second cam slots to hold opposite sides of the first lumber and move the first lumber to contact a second lumber. One or more encoders can be provided for sensing a position of the first upper cam-follower and second upper cam-follower.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention.

What is claimed is:

1. A stud plate connector system, comprising:
    a base plate having a first cam slot and a second cam slot, wherein the second cam slot is approximately a mirror image of the first cam slot;
    a first upper cam-follower located within the first cam slot;
    a second upper cam-follower located within the second cam slot, wherein the first and second cam-followers hold opposite sides of a first lumber and move the first lumber to contact a second lumber;
    a first lower gripper and a second lower gripper for holding the second lumber in a perpendicular direction with respect to the first lumber;
    a bonding device located before to the first and second lumber, wherein the bonding device bonds the first and second lumber together; and
    a plurality actuators configured to move the first lower gripper and a second lower gripper to hold the second lumber in a perpendicular direction with respect to the first lumber.

2. The stud plate connector system of claim 1, wherein the first cam slot and the second cam slot form a "Y" shape.

3. The stud plate connector system of claim 1, wherein the first upper cam-follower and the second upper cam-follower comprise linear rails.

4. The stud plate connector system of claim 1, wherein the first upper cam-follower and the second upper cam-follower comprise cam-sliders.

5. The stud plate connector system of claim 1, wherein the first lower gripper and the second lower gripper comprise linear rails.

6. The stud plate connector system of claim 1, wherein the first lower gripper and the second lower gripper comprise cam-sliders.

7. The stud plate connector system of claim 1, further comprising:
   a first actuator configured to move the first and second upper cam-followers along the first and second cam slots to hold opposite sides of the first lumber and move the first lumber to contact the second lumber.

8. The stud plate connector system of claim 7, wherein the first actuator is located behind the base plate.

9. The stud plate connector system of claim 7, wherein the first actuator is located over the base plate.

10. The stud plate connector system of claim 1, wherein a second actuator of the plurality of actuators is located adjacent to the first lower gripper and a third actuator of the plurality of actuators is located adjacent to the second lower gripper.

11. The stud plate connector system of claim 1, wherein a second actuator of the plurality of actuators is located behind the base plate and the first lower gripper, and a third actuator of the plurality of actuators is located behind the base plate and the second lower gripper.

12. The stud plate connector system of claim 1, further comprising an encoder for sensing a position of the first upper cam-follower and second upper cam-follower.

13. A method for joining lumber for a stud plate connector system, the method comprising:
   providing a base plate having a first cam slot and a second cam slot, wherein the second cam slot is approximately a mirror image of the first cam slot;
   receiving a first lumber via a first upper cam-follower and a second upper cam-follower, wherein the first upper cam-follower and second upper cam-follower are within the first cam slot and the second cam slot, respectively;
   receiving a second lumber via a first lower gripper and a second lower gripper;
   holding the second lumber in a perpendicular direction with respect to the first lumber using the first lower gripper and the second lower gripper;
   moving the first and second upper cam-followers along the first and second cam slots to hold opposite sides of the first lumber and move the first lumber to contact the second lumber;
   using a bonding device to bond the first and second lumber together; and
   using a plurality actuators to move the first lower gripper and a second lower gripper to hold the second lumber in a perpendicular direction with respect to the first lumber.

14. The method of claim 13, wherein the first cam slot and the second cam slot form a "Y" shape.

15. The method of claim 13, wherein the first upper cam-follower and the second upper cam-follower comprise linear rails.

16. The method of claim 13, wherein the first upper cam-follower and the second upper cam-follower comprise cam-sliders.

17. The method of claim 13, wherein the first lower gripper and the second lower gripper comprise linear rails.

18. The method of claim 13, wherein the first lower gripper and the second lower gripper comprise a cam-sliders.

19. The method of claim 13, further comprising:
   using a first actuator of the plurality of actuators to move the first and second upper cam-followers along the first and second cam slots to hold opposite sides of the first lumber and move the first lumber to contact a second lumber.

20. The method of claim 19, wherein the first actuator is located behind the base plate.

21. The method of claim 13, further comprising providing an encoder for sensing a position of the first upper cam-follower and second upper cam-follower.

* * * * *